(12) United States Patent
Ambruson et al.

(10) Patent No.: US 9,960,716 B2
(45) Date of Patent: May 1, 2018

(54) CONTROL TIMING AND SEQUENCING FOR A MULTI-PHASE ELECTRIC MOTOR

(71) Applicant: Allegro Microsystems, LLC, Worcester, MA (US)

(72) Inventors: Lyndon Ambruson, Warren, MA (US); Robert Stoddard, Lincoln, MA (US)

(73) Assignee: Allegro MicroSystems, LLC, Worcester, MA (US)

( * ) Notice: Subject to any disclaimer, the term of this patent is extended or adjusted under 35 U.S.C. 154(b) by 215 days.

(21) Appl. No.: 15/056,287

(22) Filed: Feb. 29, 2016

(65) Prior Publication Data

US 2017/0250634 A1    Aug. 31, 2017

(51) Int. Cl.
*H02P 6/17* (2016.01)
*H02P 6/16* (2016.01)
*H02P 6/182* (2016.01)

(52) U.S. Cl.
CPC .................. *H02P 6/17* (2016.02); *H02P 6/16* (2013.01); *H02P 6/182* (2013.01)

(58) Field of Classification Search
CPC ...... H02K 11/215; H02K 11/21; H02K 21/00; H02K 29/08; H02P 6/16; H02P 2207/05; H02P 6/30; H02P 7/29; H02P 25/03; H02P 6/14; H02P 6/17; H02P 6/18
See application file for complete search history.

(56) References Cited

U.S. PATENT DOCUMENTS 5,663,616 A    9/1997  Stringfellow et al.
8,729,841 B2   5/2014  Reynolds et al.
8,917,043 B2   12/2014 Reynolds et al.
8,917,044 B2   12/2014 Reynolds et al.
2004/0140785 A1  7/2004  Szulyk
2010/0090633 A1*  4/2010  Deller .................... H02K 29/08
                                                              318/400.39

(Continued)

FOREIGN PATENT DOCUMENTS

CN        103414433        11/2013

OTHER PUBLICATIONS

Search Report and Written Opinion dated May 9, 2017 for PCT Application No. PCT/US2017/013695, 14 pages.

(Continued)

*Primary Examiner* — Bentsu Ro
*Assistant Examiner* — Thai Dinh

(57) ABSTRACT

Described embodiments provide an electronic circuit for controlling a motor. The electronic circuit includes a magnetic field sensing circuit responsive to magnetic field sensing elements disposed to sense rotation of the motor. The magnetic field sensing elements generate magnetic field signals, each having a state indicative of at least one of the rotational position and a rotation speed of the motor. A position and speed sensing circuit generates a signal representative of the rotational position of the motor and tracks state changes of the magnetic field signals. A gate driver circuit generates motor drive signals that drive the motor based upon the sensed rotational position. The position and speed sensing circuit generates a qualified control signal based upon a determined valid state change of the magnetic field signals. The gate driver circuit generates the motor drive signals based, at least in part, upon the qualified control signal.

33 Claims, 8 Drawing Sheets

(56) References Cited

U.S. PATENT DOCUMENTS

| | | | |
|---|---|---|---|
| 2013/0009578 A1* | 1/2013 | Reynolds | H02P 6/14 318/400.14 |
| 2013/0113400 A1* | 5/2013 | Kishimoto | H02P 6/16 318/400.14 |
| 2013/0200832 A1* | 8/2013 | Oh | H02P 6/00 318/400.37 |
| 2014/0340008 A1 | 11/2014 | Reynolds et al. | |
| 2014/0340009 A1 | 11/2014 | Reynolds et al. | |
| 2015/0280633 A1* | 10/2015 | Marohl | H02P 27/085 318/503 |

OTHER PUBLICATIONS

Firmansyah et al. "Six-Step Commutation with Round Robin State Machine to Alleviate Error in Hall-Effect-Sensor Reading for BLDC Motor Control", IEEE, International Conference on Electrical Engineering and Computer Science, Nov. 24-25, 2014, 3 pages.
Alecsa et al "An FPGA Implementation of a Brushless DC Motor Speed Controller" IEEE, $16^{th}$ International Symposium for Design and Technology in Electronic Packaging, Sep. 23-26, 2010, 4 pages.

\* cited by examiner

CONTROL TIMING AND SEQUENCING FOR A MULTI-PHASE ELECTRIC MOTOR

CROSS-REFERENCE TO RELATED APPLICATIONS

None.

STATEMENT REGARDING FEDERALLY SPONSORED RESEARCH OR DEVELOPMENT

None.

BACKGROUND

Circuits to control and drive brushless direct current (BLDC) electric motors are known. Such motors might be implemented as multi-phase electric motors having drive signals corresponding to electrical windings of the motor. In some implementations, the control circuit might include or be coupled to one or more sensors, for example, Hall effect sensors or other similar devices, to sense a position and/or rotational speed of the motor. For example, Hall effect sensors might be employed to sense a magnetic field associated with the motor (or an object coupled to the motor, for example a fan or a crankshaft) as it rotates and, thus, determine a position and/or rotational speed.

In some arrangements, the sensed position and/or rotational speed might be employed to determine the drive signals for the electric motor. For example, the control circuit might change or modulate a shape of the drive signals that drive the electric motor, sense a direction of motion of the motor (e.g., forward or reverse), sense "windmilling" conditions where the motor is moving without being driven by the drive signals, or provide a phase advance of the drive signals to align a phase of a back electromotive force of the motor and a phase of the current through the motor.

In some arrangements, the Hall effect sensors might be sensitive to noise and/or generate output glitches, which can, in turn, lead to the drive signals of the motor being inaccurate relative to the state (e.g., position and/or rotational speed) of the motor. Such inaccuracies between the drive signals and the motor state can cause motor slow down and motor shutdown conditions.

In view of the above, it would be desirable to provide electric motor control circuits and associated methods that can more accurately determine the rotational position of the motor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides an electronic circuit for controlling a moto. The electronic circuit includes a magnetic field sensing circuit responsive to a plurality of magnetic field sensing elements that sense rotation of the motor and generate a respective plurality of magnetic field signals. Each magnetic field signal has a respective state indicative of a rotational position of the motor. A position and speed sensing circuit generates a signal representative of at least one of the rotational position of the motor and a rotational speed of the motor. The position and speed sensing circuit also tracks state changes of the plurality of magnetic field signals. A gate driver circuit generates one or more motor drive signals that drive the motor based, at least in part, upon the sensed rotational position. The one or more motor drive signals control a voltage applied to the motor. The position and speed sensing circuit generates at least one qualified control signal based upon a determined valid state change of the plurality of magnetic field signals. The gate driver circuit generate the one or more motor drive signals based, at least in part, upon the qualified control signal.

In an embodiment, a given state of the plurality of magnetic field signals corresponds to a digital output generated based upon the sensed rotation of the motor by the plurality of magnetic field sensing elements. In an embodiment, the position and speed sensing circuit modifies one or more status indicators based upon the state of the plurality of magnetic field signals. In an embodiment, the one or more status indicators include a previous state indicator associated with at least one previous state of the plurality of magnetic field signals. A current state indicator is associated with a current state of the plurality of magnetic field signals. A motor direction indicator is set to one of a plurality of values based upon a detected direction of rotation of the motor and a desired direction of rotation of the motor.

In an embodiment, the position and speed sensing circuit determines that a valid state change of the plurality of magnetic field signals has occurred when the motor direction indicator is not set and the current state indicator is equal to an expected value determined based upon the previous state indicator. The at least one qualified control signal is generated for each valid state change.

In an embodiment, the position and speed sensing circuit determines that an invalid state change of the plurality of magnetic field signals has occurred when the motor direction indicator is not set and the current state indicator is not equal to an expected value determined based upon the previous state indicator, wherein no qualified control signal is generated for each invalid state change. In an embodiment, the position and speed sensing circuit ignores an invalid state change until the motor direction indicator is set for a predetermined number of state changes of the plurality of magnetic field signals and the motor direction indicator has been set for the predetermined number of state changes, when the at least one qualified control signal is generated and the motor direction indicator is cleared to a value associated with a valid state change. In an embodiment, the predetermined number of state changes is two. In an embodiment, the position and speed sensing circuit, for a determined invalid state change of the plurality of magnetic field signals, sets the motor direction indicator to a value associated with the invalid state change, and set the expected value based upon the current state indicator.

In another aspect, an electronic circuit for controlling a motor is provided that includes a magnetic field sensing circuit. The magnetic field sensing circuit is responsive to a plurality of magnetic field sensing elements disposed to sense rotation of the motor and generates a respective plurality of magnetic field signals. Each magnetic field signal has a respective state indicative of a rotational position of the motor. A position and speed sensing circuit generates a signal representative of at least one of the rotational position of the motor and a rotational speed of the motor, wherein the rotational position is associated with state changes of the plurality of magnetic field signals. A gate driver circuit generates one or more motor drive signals that drive the motor based, at least in part, upon the sensed rotational position, wherein the one or more motor drive signals control a voltage applied to the motor. The position and speed sensing circuit generates at least one qualified control signal a predetermined number of times for an associated valid state change of the plurality of magnetic field signals.

In an embodiment, the predetermined number is one. In an embodiment, a given state of the plurality of magnetic field signals corresponds to a digital output generated based upon the sensed rotational position of the motor. In an embodiment, the position and speed sensing circuit modifies one or more status indicators based upon the determined state of the plurality of magnetic field signals. In an embodiment, the one or more status indicators include a previous state indicator associated with at least one previous state of the plurality of magnetic field signals, a current state indicator associated with a current state of the plurality of magnetic field signals, and a motor direction indicator associated with a detected direction of rotation of the motor.

In an embodiment, the position and speed sensing circuit determines that a valid state change of the plurality of magnetic field signals has occurred when the motor direction indicator is not set and the current state indicator is equal to an expected value determined based upon the previous state indicator. For each valid state change, the at least one qualified control signal is generated.

In an embodiment, the position and speed sensing circuit determines that an invalid state change of the plurality of magnetic field signals has occurred when motor direction indicator is not set and the current state indicator is not equal to an expected value determined based upon the previous state indicator, and no qualified control signal is generated for each invalid state change. In an embodiment, the position and speed sensing circuit ignores an invalid state change until the motor direction indicator is set for a predetermined number of consecutive state changes of the plurality of magnetic field signals. When the motor direction indicator has been set for the predetermined number of consecutive state changes, the at least one qualified control signal is generated and the motor direction indicator is cleared to a value associated with a valid state change. In an embodiment, the predetermined number of consecutive state changes is two.

In an embodiment, the gate driver circuit generates the one or more motor drive signals as one of: a trapezoidal signal, a sine wave signal, and a square wave signal. In an embodiment, the at least one control signal is insensitive to glitches in state changes of the plurality of magnetic field signals. In an embodiment, the plurality of magnetic field sensing elements includes Hall effect magnetic field sensing elements. In an embodiment, the motor is a multi-phase electric motor and the gate driver circuit includes a plurality of half-bridge circuits, each half-bridge circuit associated with a given phase of the multi-phase electric motor, wherein each half-bridge circuit is configured to generate a corresponding one of the motor drive signals, each motor drive signal having a phase that is offset from others of the motor drive signals.

In an embodiment, the one or more motor drive signals include pulse width modulated signals having respective modulations corresponding to relationships of at least one of a current through the motor and a phase of a voltage applied to the motor. In an embodiment, the gate driver circuit generates the motor drive signals having respective phase advances, the phase advances to align a phase of a current through the motor and a phase of a voltage applied to the motor.

In another aspect, a method of controlling a motor by a motor control circuit is provided. The method includes sensing, responsive to a plurality of magnetic field sensing elements, a rotational position of the motor. A respective plurality of magnetic field signals is generated, each having a respective state indicative of the sensed rotational position of the motor. A signal representative of at least one of the rotational position of the motor and a rotational speed of the motor is generated and state changes of the plurality of magnetic field signals are tracked. One or more motor drive signals are generated that drive the motor based, at least in part, upon the sensed rotational position of the motor, wherein the one or more motor drive signals control a voltage applied to the motor. At least one qualified control signal is generated a predetermined number of times for an associated valid state change of the plurality of magnetic field signals.

In an embodiment, the method also includes generating a given state of the plurality of magnetic field signals as a digital signal based upon the sensed rotational position of the motor. In an embodiment, the method also includes modifying one or more status indicators based upon the determined state of the plurality of magnetic field signals.

In an embodiment, the one or more status indicators include a previous state indicator associated with at least one previous state of the plurality of magnetic field signals, a current state indicator associated with a current state of the plurality of magnetic field signals, and a motor direction indicator associated with a detected direction of rotation of the motor.

In an embodiment, the method also includes determining that a valid state change of the plurality of magnetic field signals has occurred when the motor direction indicator is not set and the current state indicator is equal to an expected value determined based upon the previous state indicator, and generating, for each valid state change, the at least one qualified control signal.

In an embodiment, the method also includes determining that an invalid state change of the plurality of magnetic field signals has occurred when motor direction indicator is not set and the current state indicator is not equal to an expected value determined based upon the previous state indicator. Invalid state changes of the plurality of magnetic field signals are ignored until the motor direction indicator is set for a predetermined number of consecutive state changes of the plurality of magnetic field signals. When the motor direction indicator has been set for the predetermined number of consecutive state changes, the method includes generating the at least one qualified control signal, and clearing the motor direction indicator. In an embodiment, the predetermined number of consecutive state changes is two.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure might be repeated in one or more subsequent figures without additional description in the specification in order to provide context for other features.

DETAILED DESCRIPTION

Figure 1:
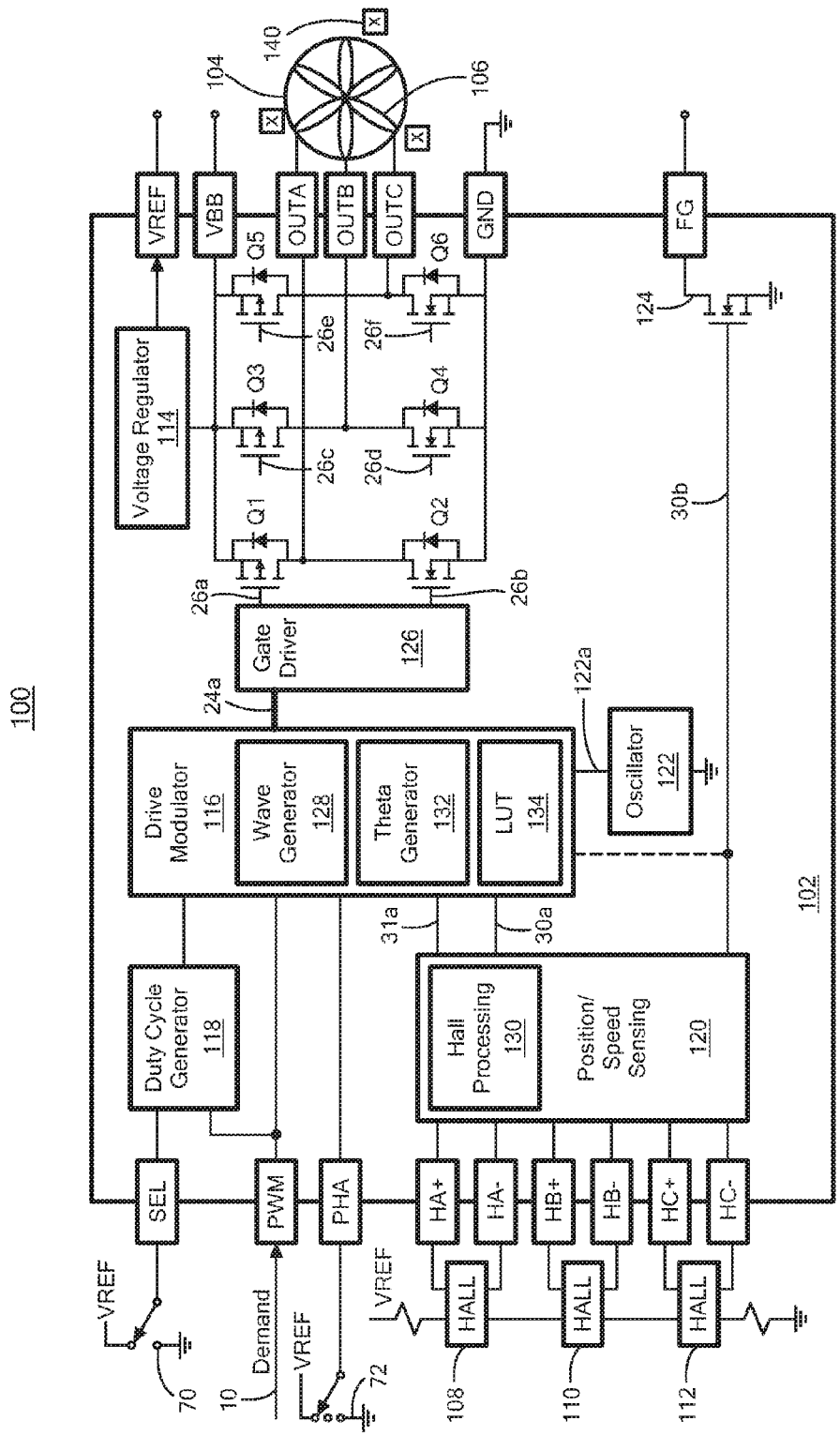
FIG. 1 is a schematic diagram showing a motor controller for operating a multi-phase electric motor in accordance with illustrative embodiments.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. There are different types of Hall effect elements, for example, a planar Hall element, a vertical Hall element, and a Circular Vertical Hall (CVH) element. There are also different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element might be a single element or, alternatively, might include two or more magnetic field sensing elements arranged in various configurations, e.g., a half bridge or full (Wheatstone) bridge. Depending on the device type and other application requirements, the magnetic field sensing element might be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back bias or other magnet, and a magnetic field sensor that senses a magnetic field density of a magnetic field.

As used herein below, the term "target object" is used to describe a mechanical structure, movement of which is sensed by a magnetic field sensor.

Described embodiments provide a motor control system for an electric motor that maintains accurate sensing of the rotational position and direction of rotation of the electric motor. As will be described, motor control systems often employ magnetic field sensing elements to sense magnetic fields that change with respect to the rotational position, speed of rotation and/or the direction of rotation of the electric motor. Described motor control systems maintain accurate sensing of the rotational position, speed and direction of rotation of the electric motor, even if the system experiences large current steps in the motor windings or other transients. Such current steps can generate large magnetic fields and, thus, inaccurate outputs of the magnetic field sensing elements. Inaccurate outputs of the magnetic field sensing elements can, in turn, lead to drive signals of the electric motor being inaccurate relative to the state of the motor (e.g., the rotational position, speed of rotation and/or the direction of rotation). Such inaccuracies between the drive signals and the motor state can cause error conditions such as motor slow down and motor shutdown.

As will be described, embodiments provide an electronic circuit for controlling a motor. The electronic circuit includes a magnetic field sensing circuit responsive to magnetic field sensing elements disposed to sense rotation of the motor. The magnetic field sensing elements generate magnetic field signals, each having a state indicative of a rotational position of the motor. A position and speed sensing circuit generates a signal representative of the rotational position of the motor and a rotational speed of the motor and tracks state changes of the plurality of magnetic field signals. A gate driver circuit generates one or more motor drive signals that drive the motor based, at least in part, upon the sensed rotational position and control a voltage applied to the motor. The position and speed sensing circuit generates a qualified control signal based upon a determined valid state change of the plurality of magnetic field signals. The gate driver circuit generates the one or more motor drive signals based, at least in part, upon the qualified control signal.

Referring to FIG. 1, an illustrative motor system 100 is shown having a motor control circuit 102 coupled to motor 104. In some embodiments, motor control circuit 102 is implemented as an integrated circuit chip having a plurality of input/output (I/O) pins, shown as labelled with respect to the function of each pin, for coupling to external signals and devices.

Although shown in FIG. 1 as being a three-phase motor, in some embodiments, motor 104 could employ other numbers of phases, as would be understood by one of ordinary skill in the art. When motor 104 is a three-phase motor, the motor includes three windings (not shown), each of which, as would be understood by one of skill in the art, can be depicted as an equivalent circuit having an inductor in series with a resistor and in series with a back electromotive force (EMF) voltage source. Each winding is driven by an associated motor drive signal, shown as motor drive signals OUTA, OUTB and OUTC. While a three-phase electric motor is shown, the same techniques apply to an electric motor having more than or fewer than three phases, and a corresponding more than or fewer than three drive signals.

Motor control circuit 102 includes drive modulator 116 coupled to receive speed demand signal 10 from an external device coupled to motor control circuit 102 (e.g., via the PWM pin). In general, speed demand signal 10 is indicative of a requested speed of motor 104. In some embodiments, speed demand signal 10 can be provided in one of a variety of formats, for example, a Single Edge Nibble Transmission (SENT) format, a Serial Peripheral Interface (SPI) format, a Local Interconnect Network (LIN) format, a CAN (Controller Area Network) format, an Inter-Integrated Circuit (I2C) format, or other similar signal formats. For example, speed demand signal 10 can be a voltage signal having a selected voltage value indicative of a desired speed of motor 104. Speed demand signal 10 can also be, for example, a pulse width modulated (PWM) signal having a selected duty cycle indicative of the desired speed of motor 104. Further, speed demand signal 10 can be a digital signal having a digital value indicative of the desired speed of motor 104.

In some embodiments, the type of speed demand signal 10 to be received by the PWM pin can be selected by a signal, SEL, applied to a SEL pin of motor control circuit 102, for example by switch 70. Although shown as a single pole double throw switch, in which case there are two selections, switch 70 can switch between more than two selections, or the SEL signal can be generated by other circuits (not shown). In some embodiments, the SEL signal and the PWM signal are coupled to duty cycle generator 118, which might provide a digital signal indicative of speed demand signal 10 to drive modulator 116. The PWM signal is also provided to drive modulator 116.

Duty cycle generator 118 might include a multiplexer (not shown) to provide a signal to a filter (not shown) to generate a filtered signal representative of a maximum PWM duty cycle that is ultimately applied to motor 104. An analog-to-digital converter (not shown) of duty cycle generator 118 might be coupled to the PWM signal and generate digital signals representative of a demand for relative speed (e.g., zero to one hundred percent) of motor 104 when speed demand signal 10 is an analog signal (e.g., a voltage signal or a PWM signal). In embodiments where speed demand signal 10 is a digital signal, duty cycle generator 118 might not operate.

Speed demand signal 10 can request (i.e., demand) a relative speed (e.g., from zero to one hundred percent) of motor 104. In some embodiments, the relative speed of motor 104 can be controlled by way of a selection of a maximum duty cycle of a PWM waveform that drives motor 104. The PWM drive signals that drive motor 104 are not to be confused with speed demand signal 10, which can be a PWM signal with a duty cycle selected to indicate a desired relative motor speed. It should be understood that the demand signal requests a relative speed, however, the absolute speed of the motor is determined by a variety factors, including, but not limited to, a type of motor and a load imposed upon the motor.

In embodiments in which speed demand signal 10 is a PWM signal, a duty cycle of speed demand signal 10 between about twenty-five percent and about one hundred percent is approximately linearly related to a resulting maximum duty cycle of PWM motor drive signals OUTA, OUTB and OUTC that drive motor 104, which are also between about twenty-five percent and about one hundred percent, respectively. In some embodiments, a PWM speed demand signal 10 with a duty cycle of less than about twenty-five percent results in motor 104 receiving no drive and motor 104 coasts to a stop.

Similarly, in some particular embodiments in which speed demand signal 10 is a voltage signal having voltage values, voltage values from about one volt to about 4.3 volts are approximately linearly related to a resulting maximum duty cycle of PWM motor drive signals OUTA, OUTB and OUTC that drive motor 104, which are from about twenty-five percent to about one hundred percent, respectively. In some embodiments, a voltage value of speed demand signal 10 less than about one volt results in motor 104 receiving no drive and motor 104 coasts to a stop.

In some embodiments, a phase advance signal, PHA, is applied to a PHA pin of motor control circuit 102, for example by circuitry external to motor control circuit 102 (shown as switch 72). The PHA signal is indicative of a selected one of a plurality of relationships between rotational speeds of motor 104 and phase advances of motor drive signals OUTA, OUTB and OUTC that drive motor 104. Motor control circuit 102 generates the motor drive signals OUTA, OUTB and OUTC having respective phase advances in response to the selected one of the plurality of relationships and in response to a detected rotational speed and/or detected position of motor 104. Motor drive signals OUTA, OUTB and OUTC are described more fully below in conjunction with FIGS. 2 and 3.

In some embodiments, motor 104 drives an associated fan 106 that can be used, for example, in a household appliance, for example, in a refrigerator. More generally, however, motor 104 can be employed to operate different types or sizes of loads (e.g., fans) in a variety of applications, for example, in different household appliances. Since various applications might have various loads, accurate detection of the position and/or rotation speed of motor 104 is needed.

One or more magnetic field sensing elements 108, 110 and 112, which, for example, might be implemented as one or more Hall effect elements, each generate differential signals at corresponding pins of motor control circuit 102. For simplicity, magnetic field sensing elements 108, 110 and 112 are referred to herein as Hall elements, although other types of magnetic field sensing elements could be employed, such as a magnetoresistance element or a magnetotransistor, as described above. In described embodiments, Hall element 108 provides differential Hall signals HA+ and HA−, Hall element 110 provides differential Hall signals HB+ and HB−, and Hall element 112 provides differential Hall signals HC+ and HC−. Hall elements 108, 110 and 112 are disposed in close proximity to motor 104 and at positions that enable Hall elements 108, 110 and 112 to sense passing magnets within motor 104. In one embodiment, Hall elements 108, 110 and 112 are positioned relative to each other so as to provide output signals that are one hundred twenty degrees offset from each other. While Hall elements 108, 110 and 112 are shown, in other embodiments, other types of magnetic field sensing elements can be used.

It will be appreciated that motor 104 can include a plurality of magnets. For these arrangements, it should be appreciated that a full cycle of the signal generated by each one of Hall elements 108, 110 and 112 is achieved upon one of the plurality of magnets passing by a respective one of the Hall elements 108, 110 and 112. Thus, each one of the Hall elements 108, 110 and 112 can generate a respective signal having a plurality of full cycles for each rotation of motor 104.

Motor control circuit 102 receives a positive power supply voltage (VBB) at a corresponding VBB pin, and a negative (or ground or circuit common) power supply voltage (GND) at a corresponding GND pin. Motor control circuit 102 provides a reference voltage (VREF) at a corresponding VREF pin, for example to power external devices, such as Hall elements 108, 110 and 112, with a known voltage generated by voltage regulator 114 from the power supply voltage VBB.

Motor control circuit 102 provides a frequency generator (FG) signal at a corresponding FG pin, which has a frequency representative of an absolute speed of rotation of motor 104. The FG signal might be generated by transistor 124 (e.g., a field effect transistor or FET) coupled in a common drain configuration using an external resistor to generate the FG signal. The FG signal can be provided to other circuits (not shown) external to motor control circuit 102.

Gate driver 126 receives one or more signals 24a from drive modulator 116 to generate variable duty cycle PWM motor drive signals OUTA, OUTB and OUTC to drive motor 104. More particularly, gate driver 126 generates gate drive signals 26a, 26b, 26c, 26d, 26e, 26f to drive FETs Q1, Q2, Q3, Q4, Q5 and Q6, respectively. The FETs Q1, Q2, Q3, Q4, Q5 and Q6 generate the variable duty cycle PWM motor drive signals OUTA, OUTB and OUTC that cause motor 104 to rotate. FETs Q1 and Q2, Q3 and Q4, and Q5 and Q6 each form a corresponding half-bridge circuit, each half-bridge circuit generating a drive signal corresponding to a given phase of motor 104 (e.g., the motor drive signals OUTA, OUTB and OUTC also each correspond to a given phase of motor 104).

Each of transistors Q1, Q2, Q3, Q4, Q5 and Q6 is shown in FIG. 1 as being an N-channel metal oxide semiconductor field effect transistor (MOSFET) and, thus, each transistor has a corresponding intrinsic body diode arranged from drain (cathode) to source (anode) of the MOSFET, making the MOSFET able to block current in only one direction. The body diodes are thus frequently utilized as freewheeling diodes for inductive loads, such as motor 104, for example when the MOSFET is used as a switch in a half-bridge circuit.

The six transistors Q1, Q2, Q3, Q4, Q5 and Q6 are synchronized by gate driver 126 to operate in saturation to provide motor drive signals OUTA, OUTB and OUTC, respectively, to motor 104. In some embodiments, such as shown in FIG. 1, transistors Q1, Q2, Q3, Q4, Q5 and Q6 are internal to motor control circuit 102. In other embodiments, transistors Q1, Q2, Q3, Q4, Q5 and Q6 might be external devices coupled to motor control circuit 102. Although shown in FIG. 1 as being N-channel MOSFETs, other types of switching elements might be employed, for example P-channel MOSFETs, bipolar junction transistors (BJTs), Silicon-Controlled Rectifiers (SCRs), thyristors, triacs, or other similar switching elements.

To prevent short circuit (or "shoot through") conditions, only one transistor in each half-bridge circuit is turned on at a given time. As a precaution, gate driver 126 controls gate drive signals 26a, 26b, 26c, 26d, 26e, 26f such that for short periods of time after one of the transistors of a given half-bridge circuit turns off, the other transistor cannot turn on and, thus, both transistors in the given half-bridge circuit are off. This time is commonly known as "dead time" of the half-bridge circuit. For the illustrative system shown in FIG. 1, during dead time for each half-bridge circuit, the upper transistor (e.g., transistors Q1, Q3 and Q5) and the lower transistor (e.g., transistors Q2, Q4 and Q6) are both off.

Power is provided to motor 104 by turning on an upper transistor (e.g., one of transistors Q1, Q3 and Q5) in a given half-bridge circuit to couple supply voltage VBB though the upper transistor to motor 104, and turning on a lower transistor (e.g., one of transistors Q2, Q4 and Q6) in another half-bridge circuit to couple ground voltage GND though the lower transistor to motor 104, allowing current to flow through a corresponding winding of motor 104. For example, if upper transistor Q1 is turned on, then one of lower transistors Q4 and Q6 could be turned on to allow a current to flow through an associated winding of motor 104.

Drive modulator 116 might include theta generator 132 and look-up table (LUT) 134 to store relationships between values of the PWM signal and the control signals 24a provided to gate driver 126.

Motor control circuit 102 can also include a position/speed sensing circuit 120 coupled to receive differential signals (e.g., differential Hall signals HA+, HA−, HB+, HB−, HC+ and HC−) from Hall elements 108, 110 and 112. Position/speed sensing circuit 120 generates one or more signals 30a, each signal related to a magnetic field sensed by a respective one of the Hall elements. Signal 30a can thus be representative of the rotational position and/or rotational speed of motor 104. Position/speed sensing circuit 120 also generates one or more signals 31a, which might include signals related to a magnetic field sensed by the Hall elements, such as an estimated angular position of the motor (e.g., qualified theta signal 619 of FIG. 6), a Hall timing pulse (e.g., qualified commutation pulse signal 621 of FIG. 6), a direction of rotation indicator (e.g., direction error signal 623 of FIG. 6), and/or a current Hall state indicator (e.g., qualified Hall signals 30a of FIG. 6), as will be described in greater detail in regard to FIG. 6. The drive modulator 116 can be coupled to receive the signals 30a and 31a. The signals 30a can be three square wave signals generated by comparing the generally sinusoidal signals generated by the Hall elements 108, 110 and 112 with a threshold value. Alternatively, the signal 30a can be one signal, for example, a serial or parallel digital signal that can represent information within separate square wave signals shown below in conjunction with FIG. 2.

Position/speed sensing circuit 120 can also be configured to generate a speed signal 30b representative of a speed of rotation of motor 104. In some embodiments, speed signal 30b is also coupled to drive modulator 116 and is used by drive modulator 116 to represent the speed of rotation of motor 104 instead of the signal(s) 30a. However, the signals(s) 30a might still be used by drive modulator 116 to represent position of motor 104. It will be appreciated that the signal(s) 30a have frequencies related to a speed of rotation of motor 104. It will also be appreciated that, due to positions of the Hall elements 108, 110 and 112 within motor 104, the signals 30a have phases and relative phase relationships indicative of a rotational position of motor 104. For example, Hall elements 108, 110 and 112 might be positioned on hundred twenty degrees apart, as indicated by position markers 140 (not shown to scale).

In some embodiments, position/speed sensing circuit 120 might include, or otherwise be coupled to, Hall processing circuit 130. Hall processing circuit 130 might be employed to process signals related to a magnetic field sensed by a respective one of the Hall elements. In some embodiments, Hall processing circuit 130 might be coupled to receive at least one of the gate drive signals 26a, 26b, 26c, 26d, 26e, 26f from gate driver 126, and might also be coupled to receive at least one of the motor drive signals OUTA, OUTB and OUTC in order to detect a zero crossing of the current through (or voltage applied to) one or more of the windings of motor 104. The zero crossing information can be used by position/speed sensing circuit 120 to estimate a position and/or back EMF of motor 104. For example, zero crossing detection might be performed as described in U.S. Pat. No.

8,917,044 filed on Aug. 30, 2012 or U.S. patent application Ser. No. 15/016,351, filed on Feb. 5, 2016, both of which are assigned to the assignee of the present application and both of which are expressly incorporated by reference herein. In some embodiments, position/speed sensing circuit 120 might include a Hall signal qualifier (not shown in FIG. 1), as will be discussed in greater detail in conjunction with FIG. 6.

Drive modulator 116 generates PWM signals 24*a* that have duty cycles that vary in accordance with sinusoid signals described more fully below in conjunction with FIG. 2, ultimately resulting in the variable duty cycle PWM motor drive signals OUTA, OUTB and OUTC being applied to motor 104. Each one of the signals OUTA, OUTB and OUTC might have a respective phase advance, which can be the same phase advance, in accordance with the PHA signal and the detected speed of rotation and/or position of motor 104. Motor control circuit 102 might also include oscillator 122 to generate a clock signal 122*a* that determines a frequency of the PWM signal generated by drive modulator 116. Drive modulator 116 might operate to provide a ramped PWM soft start to apply drive signals to motor 104 that ramp up to the desired maximum PWM duty cycle. This arrangement avoids high start-up currents as motor 104 comes up to speed.

Figure 2:
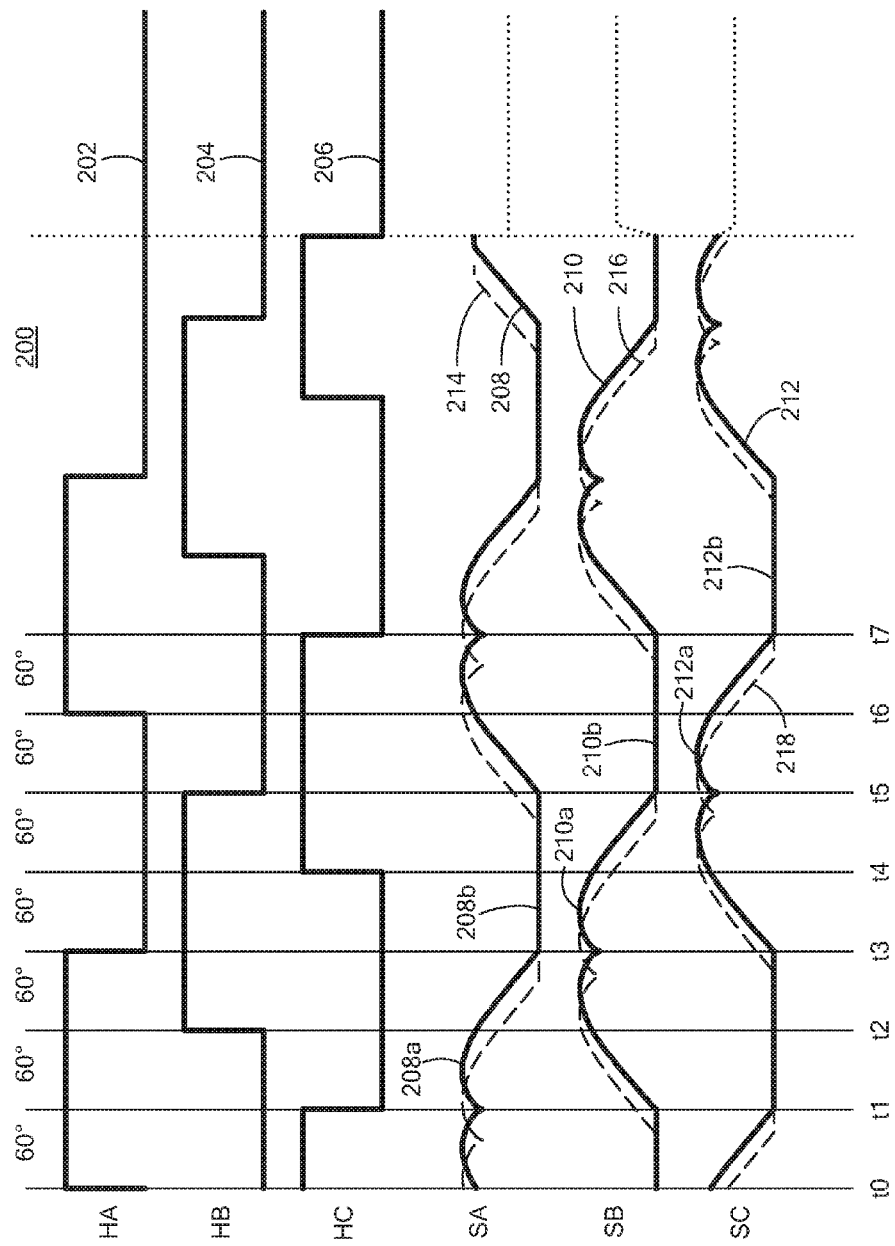
FIG. 2 is a graph showing illustrative signals of the motor controller of FIG. 1.

Referring now to FIG. 2, a graph 200 has a horizontal axis with a scale in units of time in arbitrary units. The graph 200 also has a vertical axis with a scale in arbitrary units. A plurality of signals is shown in the graph 200, and each signal has a separate vertical scale. As shown in FIG. 2, signals 202, 204, 206 are representative of the signals 30*a* of FIG. 1 based upon differential Hall signals HA+ and HA−, HB+ and HB−, and HC+ and HC−, respectively. For example, as described in conjunction with FIG. 6, signals HA 202, HB 204 and HC 206 might be generated by using comparators (e.g., comparators 602, 604 and 606) upon signals generated by the three Hall elements 108, 110 and 112 of FIG. 1, resulting in three square wave signals. As described above in conjunction with FIG. 1, Hall elements 108, 110 and 112 are physically positioned with respect to motor 104 so that the phase of signals 202, 204 and 206 are one hundred twenty degrees offset relative to each other as motor 104 rotates. There can be one or more cycles of each one of the signals 202, 204 and 206 upon each rotation of motor 104.

SA signal 208 corresponds to a sinusoidal signal generated by and internal to drive modulator 116 of FIG. 1. SA signal 208 need not be output from drive modulator 116. Instead, as described more fully in conjunction with FIG. 3, SA signal 208 might be used to generate a PWM signal having a duty cycle that varies according to values of SA signal 208.

SA signal 208 has peaks, for example, a peak 208*a*, and low or zero regions, for example a low or zero region 208*b*. In some embodiments, depending on a selection by way of a value of speed demand signal 10 of FIG. 1, at the peaks of SA signal 208, a resulting PWM signal will have a one hundred percent duty cycle, i.e., a state of the PWM signal will be fully on and the PWM signal will stop switching. In some embodiments, at low or zero regions of SA signal 208, a resulting PWM signal will have a zero percent duty cycle, i.e. a state of the PWM signal will be fully off in the PWM signal will stop switching.

SB signal 210 and SC signal 212 correspond to sinusoidal signals generated by and internal to drive modulator 116 of FIG. 1. Versions 214, 216 and 218 of signals 208, 210 and 212 are the same as signals 208, 210 and 212, respectively, but are advanced in phase. In some embodiments, the amount of the phase advance is determined based upon the PHA signal shown in FIG. 1, and a detected absolute speed of rotation of motor 104, detected by position/speed sensing circuit 120 of FIG. 1.

Signals 208, 210 and 212 have phases corresponding to phases of signals 202, 204 and 206, respectively. In particular, SA signal 208 achieves a lowest value at a time t3 coincident with a falling edge of signal 202. Similarly, SB signal 210 achieves a lowest value at a time t5 coincident with a falling edge of signal 204 and SC signal 212 achieves a lowest value at a time t7 coincident with a falling edge of signal 206. Thus, signals 208, 210 and 212 have phases one hundred twenty degrees apart like the signals 202, 204 and 206. Phase advances described herein are relative phase advances, relative to positions of the signals 208, 210 and 212, which have zero phase advances relative to the signals 202, 204 and 206, respectively.

While signals 208, 210 and 212 could be applied as signals to drive motor 104, increased efficiency is achieved by employing PWM signals related to signals 208, 210 and 212 (or to the phase advanced signals 214, 216 and 218) to drive motor 104. While signals 208, 210 and 212 show particular sinusoidal shapes particularly suitable for driving a three phase electric motor, in other embodiments, signals having other shapes can be used. For example, square wave shaped signals or trapezoidal shaped signals corresponding to signals 208, 210 and 212 can be used.

Figure 3:
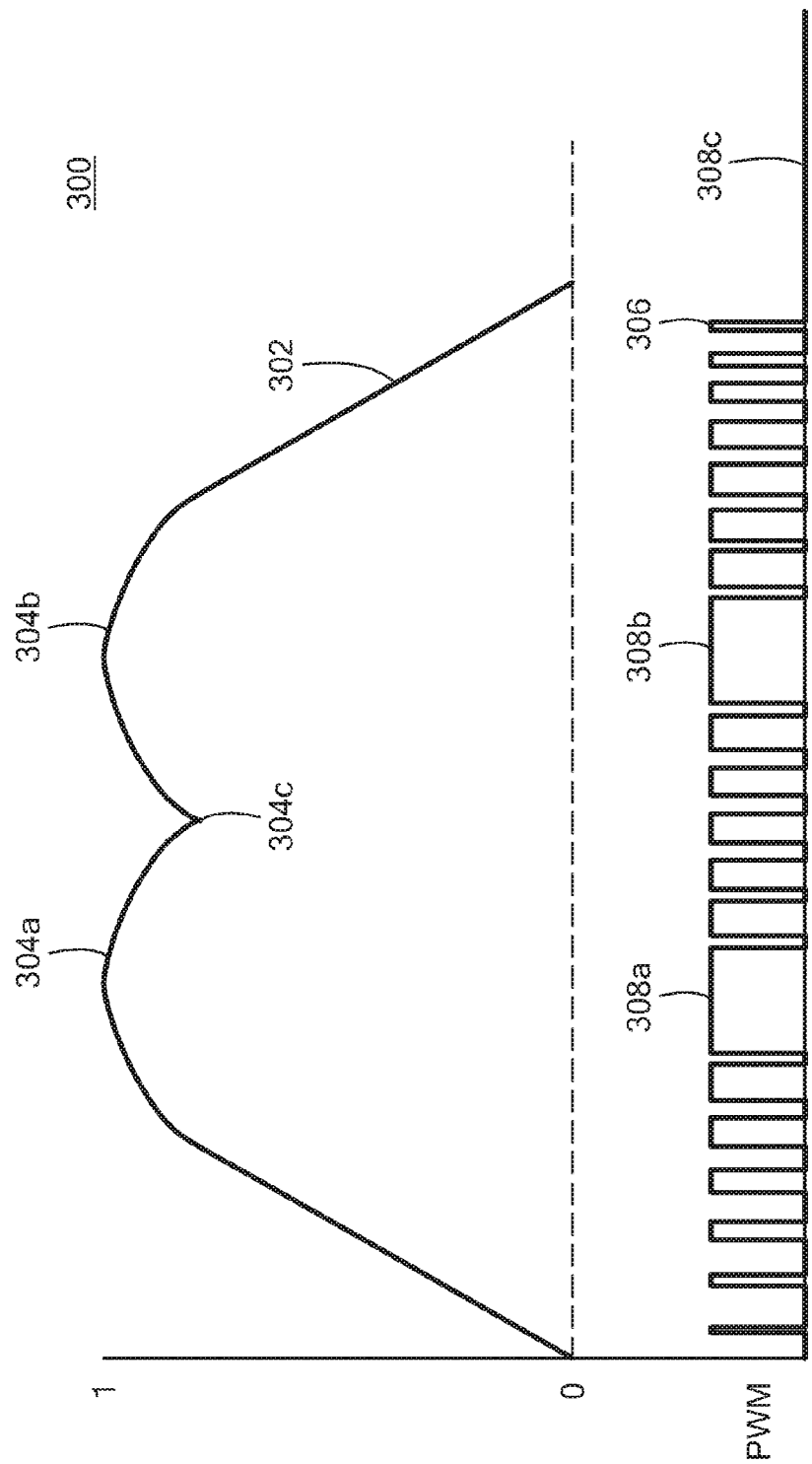
FIG. 3 is a graph showing a portion of the illustrative signals of FIG. 2.

Referring now to FIG. 3, graph 300 has a horizontal axis with a scale in units of time in arbitrary units and a vertical axis with a scale in arbitrary units. Signal 302 is like a portion of SA signal 208 of FIG. 2, here shown in expanded form for clarity. As shown, signal 302 has two peaks 304*a* and 304*b* and a central valley 304*c*. A corresponding PWM signal 306 is shown in time synchronization with signal 302. PWM signal 306 has regions (e.g., regions 308*a* and 308*b*) with a highest duty cycle (here, one hundred percent) coincident with the peaks 304*a* and 304*b* of signal 302. Signal 306 also has regions (e.g., region 308*c*) with a lowest duty cycle (here zero percent) coincident with zero values of signal 302. Thus, PWM signal 306 has a duty cycle at any time that is related to a value of signal 302 at that same time.

While PWM signal 306 is shown to achieve a one hundred percent duty cycle coincident with the peaks 304*a* and 304*b*, other highest duty cycles are also possible, and the highest duty cycle can be selected by way of speed demand signal 10 of FIG. 1. Thus, PWM signal 306 is representative of speed demand signal 10 having a highest demand signal value (e.g., one or one hundred percent). If speed demand signal 10 has a lower value, then the maximum duty cycle of PWM signal 306 at the peaks of signal 302 will be less than one hundred percent.

Thus, each of signals 208, 210 and 212 of FIG. 2 (or the corresponding phase advanced signals 214, 216 and 218) have a corresponding PWM signal similar to PWM signal 306, but each PWM signal at a different phase relative to each other. These PWM signals are used to drive motor 104. Each one of the PWM signals has a respective duty cycle that varies in time according to values of a respective one of signals 208, 210 and 212 of FIG. 2 (or the corresponding phase advanced signals 214, 216 and 218).

Figure 4:
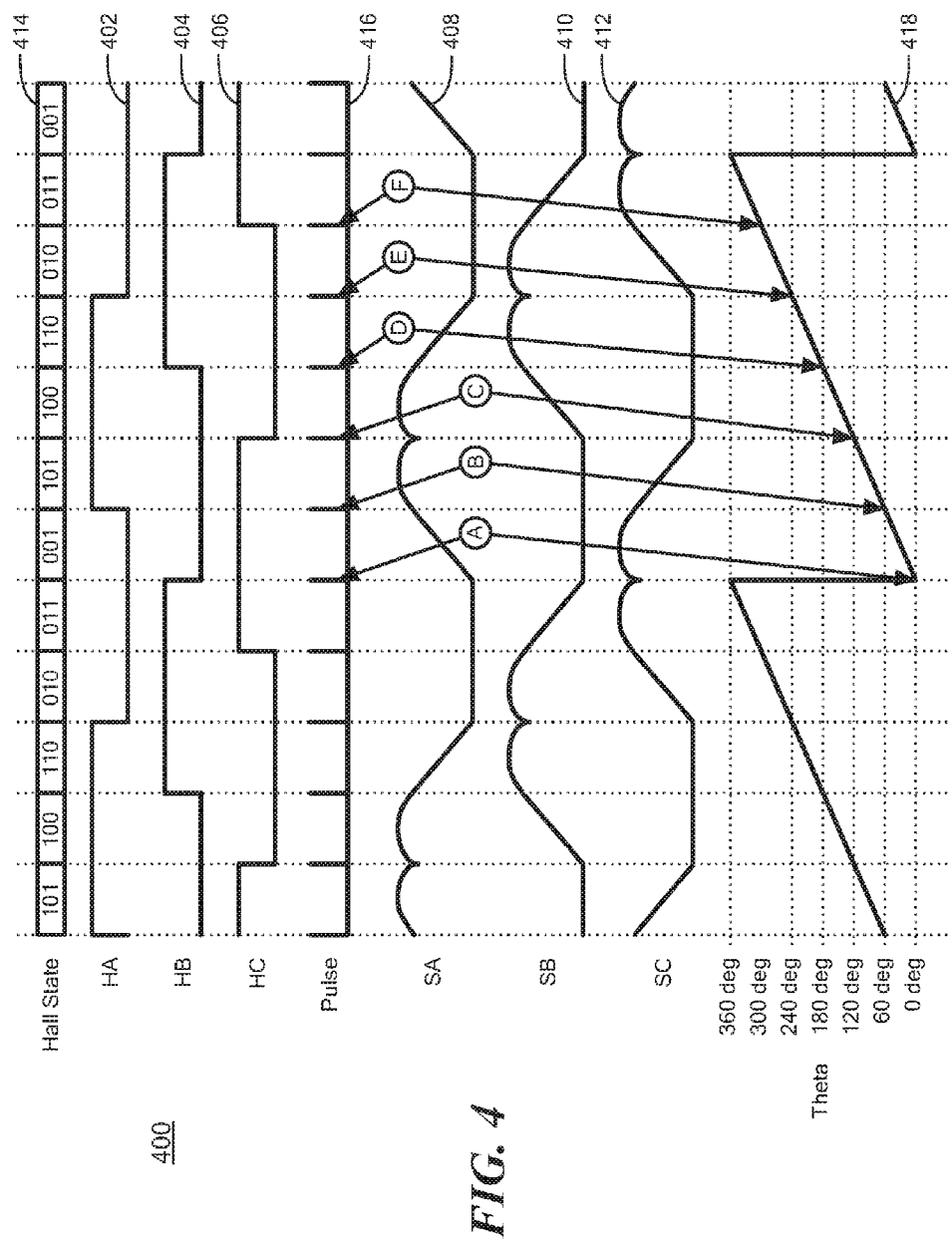
FIG. 4 is a plot showing additional illustrative signals of the motor controller of FIG. 1.
Figure 5:
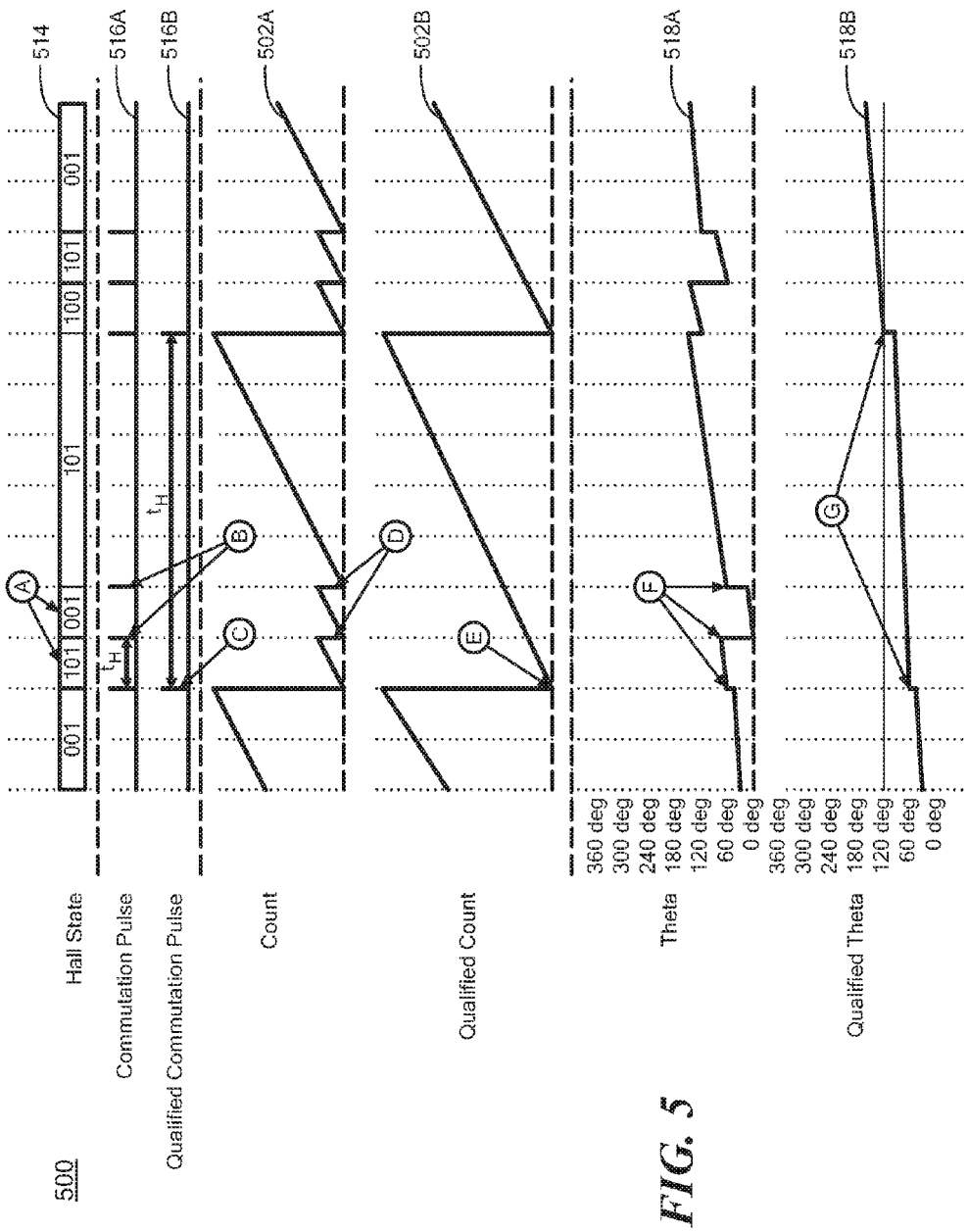
FIG. 5 is another plot showing illustrative signals of the motor controller of FIG. 1.

As will be discussed in greater detail below in conjunction with FIGS. 6-8, FIGS. 4 and 5 show illustrative plots of signals of motor system 100. For example, FIG. 4 shows the Hall states of state machine 800 of FIG. 8 versus time (and rotation of motor 104) in relation to the commutation pulse signal 416, modulation signals SA 408, SB 410 and SC 412 used to generate motor drive signals OUTA, OUTB and OUTC, and theta signal 418 representing the angular position of motor 104. FIG. 5 illustrates an example condition of the signals shown in FIG. 4. In particular, FIG. 5 shows an illustrative error condition in the count value (waveform 502A) that counts the time between Hall transitions, and in the theta signal (waveform 518A) that is associated with the rotational position of motor 104.

Figure 6:
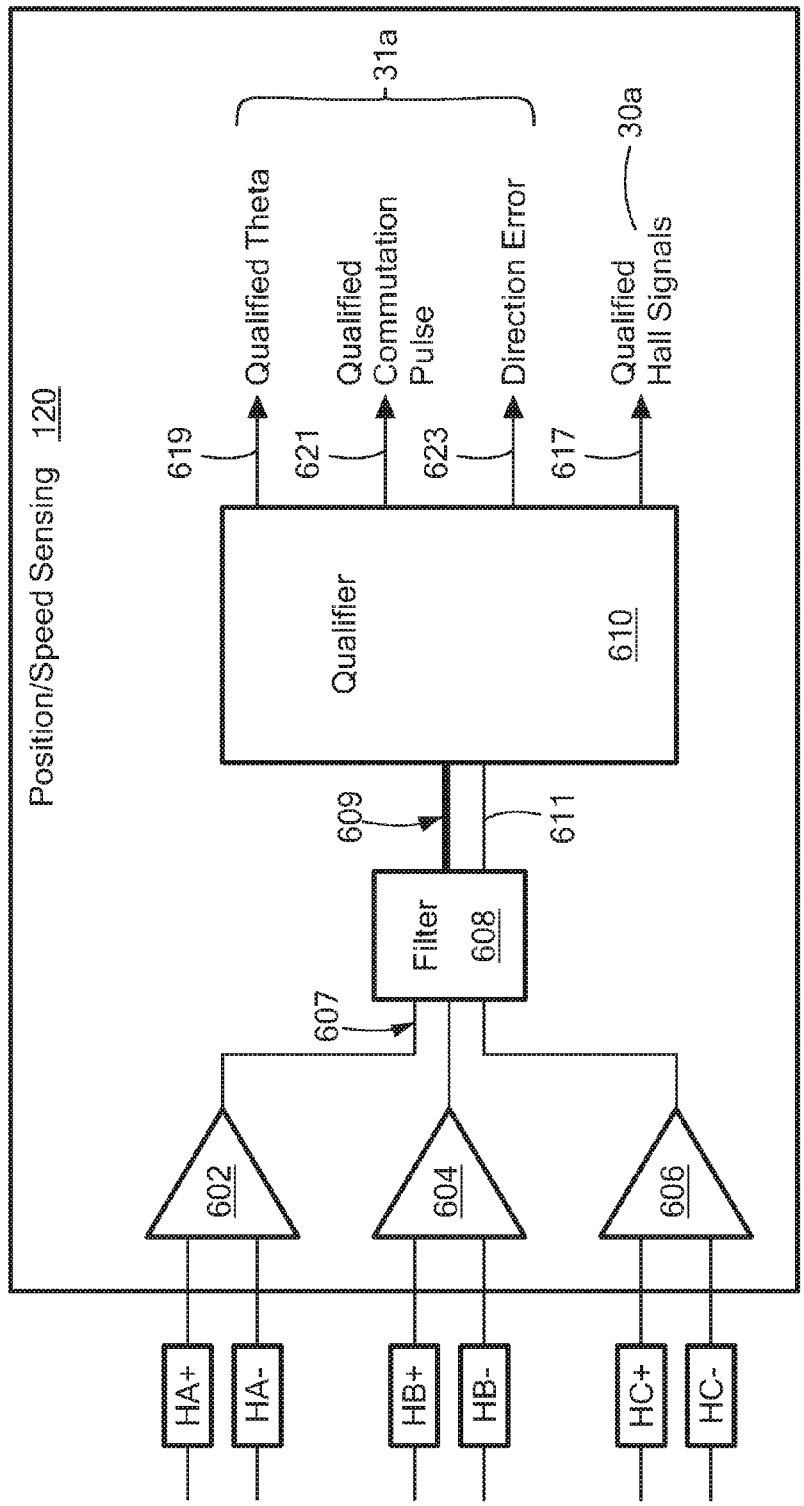
FIG. 6 is a block diagram of a position and speed sensing circuit of the motor controller of FIG. 1.

Referring to FIG. 6, additional detail of a portion of position/speed sensing circuit 120 is shown. As shown in FIG. 6, position/speed sensing circuit 120 includes comparators 602, 604 and 606 to receive differential Hall signals HA+ and HA−, HB+ and HB−, and HC+ and HC−, respectively (e.g., from Hall elements 108, 110 and 112, respectively). Comparators 602, 604 and 606 each generate Hall signals 607 based upon the respective differential Hall signals HA+ and HA−, HB+ and HB−, and HC+ and HC−. Hall signals 607 are provided to filter 608, which generates filtered Hall signals 609. For example, filter 608 might remove high frequency transient components from Hall signals 607 to generate filtered Hall signals 609. Filter 608 also provides a pulse signal, commutation pulse signal 611, that is generated at each change of the Hall state, to qualifier 610.

Figure 8:
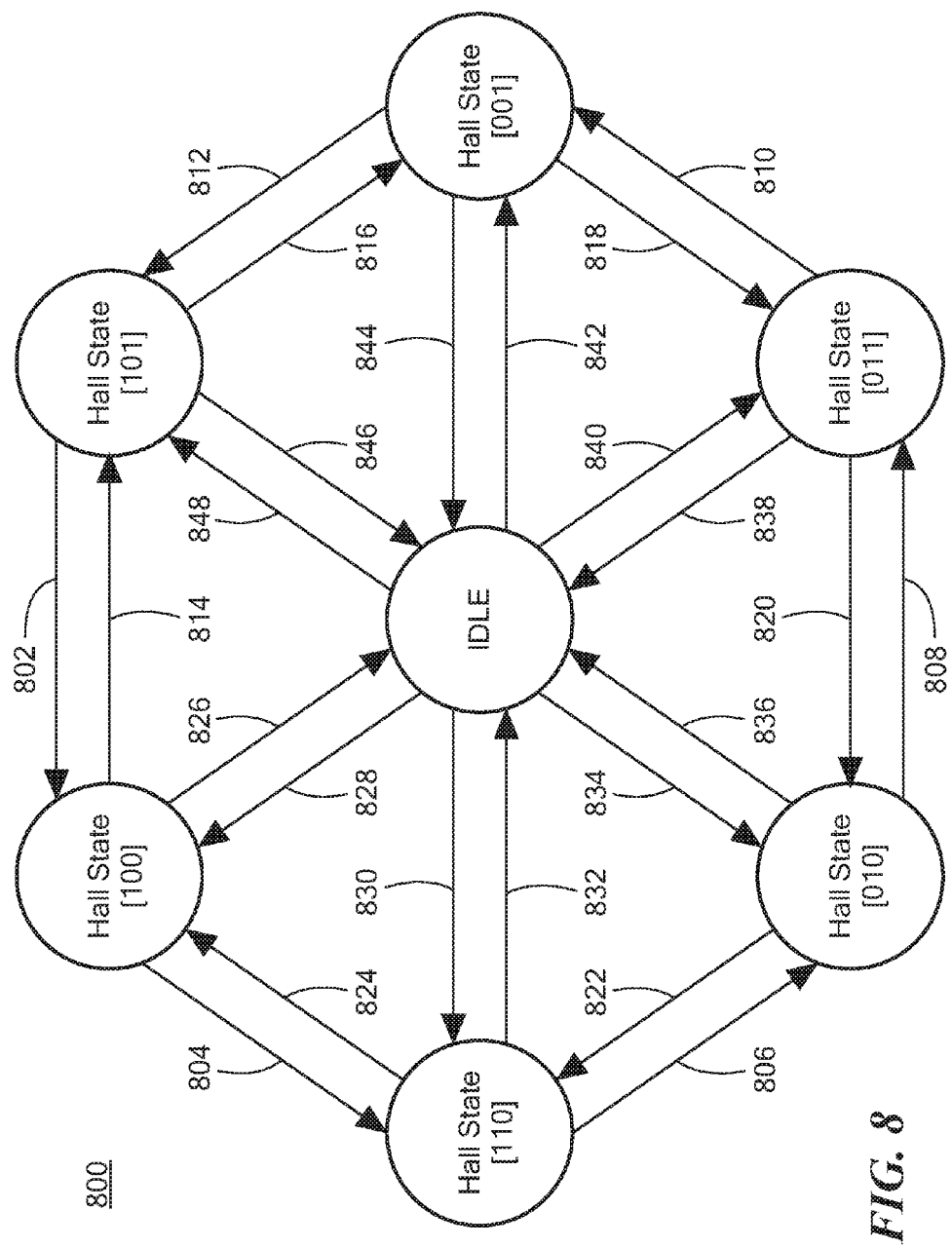
FIG. 8 is a state diagram showing illustrative processing states of the position and speed sensing circuit of FIG. 6.

Qualifier 610 processes filtered Hall signals 609 and commutation pulse signal 611. For example, qualifier 610 might be implemented as a portion of Hall processing circuit 130 of FIG. 1. As will be described in greater detail below, in some embodiments qualifier 610 might operate a state machine (e.g., as shown in FIG. 8) to verify or validate the filtered Hall signals 609 and commutation pulse signal 611, to generate qualified Hall signals 30*a* and one or more qualified control signals 31*a*. Thus, as will be described, qualifier 610 ensures that the resulting qualified signals (e.g., 30*a* and 31*a*) are accurate representations of rotational position and/or rotational speed of motor 104.

Qualifier 610 receives filtered Hall signals 609 and generates qualified Hall signals 617, which might be output from position/speed sensing circuit 120 as signals 30*a*. The qualified Hall signals are indicative of a detected position of motor 104. Further, qualifier 610 generates qualified theta (position) signal 619, qualified commutation pulse signal 621 and direction error signal 623, which might be output from position/speed sensing circuit 120 as signals 31*a*. Each of qualified signals 31*a* will be described in greater detail in conjunction with FIG. 5.

In some embodiments, qualifier 610 might also employ zero crossing information indicative a zero crossing of a current or voltage waveform of motor 104 (for example, a current through a winding, or a voltage applied to a winding), and be employed by qualifier 610 to assist in determining, for example, a direction of rotation of motor 104.

Theta generator 132 of drive modulator 116 is coupled to receive signals 31*a*, for example qualified theta signal 619 and qualified commutation pulse signal 621. Theta generator 132 might also receive qualified Hall signals 30*a* (or a value related to the qualified Hall signals) from LUT 134. Theta generator 132 generates a theta ramp signal (e.g., the angle signal waveform 418 of FIG. 4, or the angle signal waveforms 518A or 518B of FIG. 5) that periodically reaches a maximum terminal value and resets to zero (or a minimum terminal value). The reset time of the ramp signal is fixed in relation to qualified theta signal 619 (i.e., a fixed rotational position of motor 104).

In operation, theta generator 132 can identify a time period, measured by counting a number of system clock transitions (e.g., based on oscillator 122 of FIG. 1), between position references identified by qualified theta signal 619. In other words, theta generator 132 can identify a time (e.g., count a number of system clock transitions) that it takes motor 104 to turn through one rotation. In some embodiments, theta generator 132 might operate in a fixed relationship to the system clock (e.g., oscillator 122), for example, by dividing the number of system clock transitions by a fixed scalar value, for example, by 64 or 32. The clock signal is used by theta generator 132 to generate a rate at which ramp values of the theta signal are incremented and output. Resets to zero of the theta ramp signal are achieved once for every revolution of the motor.

Theta generator 132 might provide a theta value to LUT 134. LUT 134 might then select one of a plurality of modulation profiles to provide to wave generator 128 to generate signals 24*a* to correspondingly generate variable duty cycle PWM motor drive signals OUTA, OUTB and OUTC to drive motor 104. For example, LUT 134 might sequence between modulation profiles based upon the theta value (e.g., qualified theta signal 619), qualified commutation pulse signal 621 and direction error signal 623 (e.g., signals 31*a*). In some embodiments, a zero crossing of the current in a motor winding (or of a voltage applied to a motor winding) might be employed by qualifier 610 to determine signals 31*a*.

In some embodiments, LUT 134 might include a first set of one or more modulation profiles for situations, such as motor start up, when the exact position and speed of the motor is not yet known. In such situations, the modulation profile might be approximately trapezoidal in shape, such that this mode of operation is referred to as "trap mode" or "trapezoidal drive mode". Similarly, in some embodiments, LUT 134 might include a second set of one or more modulation profiles for situations when the exact position and speed of the motor is known (e.g., synchronized or synched). In such situations, the modulation profile might be approximately sinusoidal in shape, such that this mode of operation is referred to as "sine mode" or "sinusoidal drive mode".

In operation, qualifier 610 receives filtered Hall signals 609, for example as individual signals from which a digital value can be generated, or directly as the 3-bit digital value. The 3-bit digital value is a Hall code that indicates the state of each magnetic field signal 202, 204 and 206 of FIG. 2. Qualifier 610 might include a register (not shown) that stores the 3-bit value, for example when a trigger signal is received. When the trigger signal is received, qualifier 610 compares the stored register value (e.g., a previously stored Hall code) with a current value of the 3-bit Hall code. In some embodiments, the trigger signal is Hall commutation pulse signal 611. Hall commutation pulse signal 611, in conjunction with the 3-bit Hall codes, is used by theta generator 132 to set the value of theta (e.g., the position of the motor) and, therefore, the values of variable duty cycle PWM motor drive signals OUTA, OUTB and OUTC, which are set to align with the theta value. By tracking a sequence of the 3-bit Hall codes, qualifier 610 can determine whether a present value of the 3-bit Hall code matches an anticipated value of the 3-bit Hall code, the anticipated value determined by one or more previous values of the 3-bit Hall code.

Figure 7:
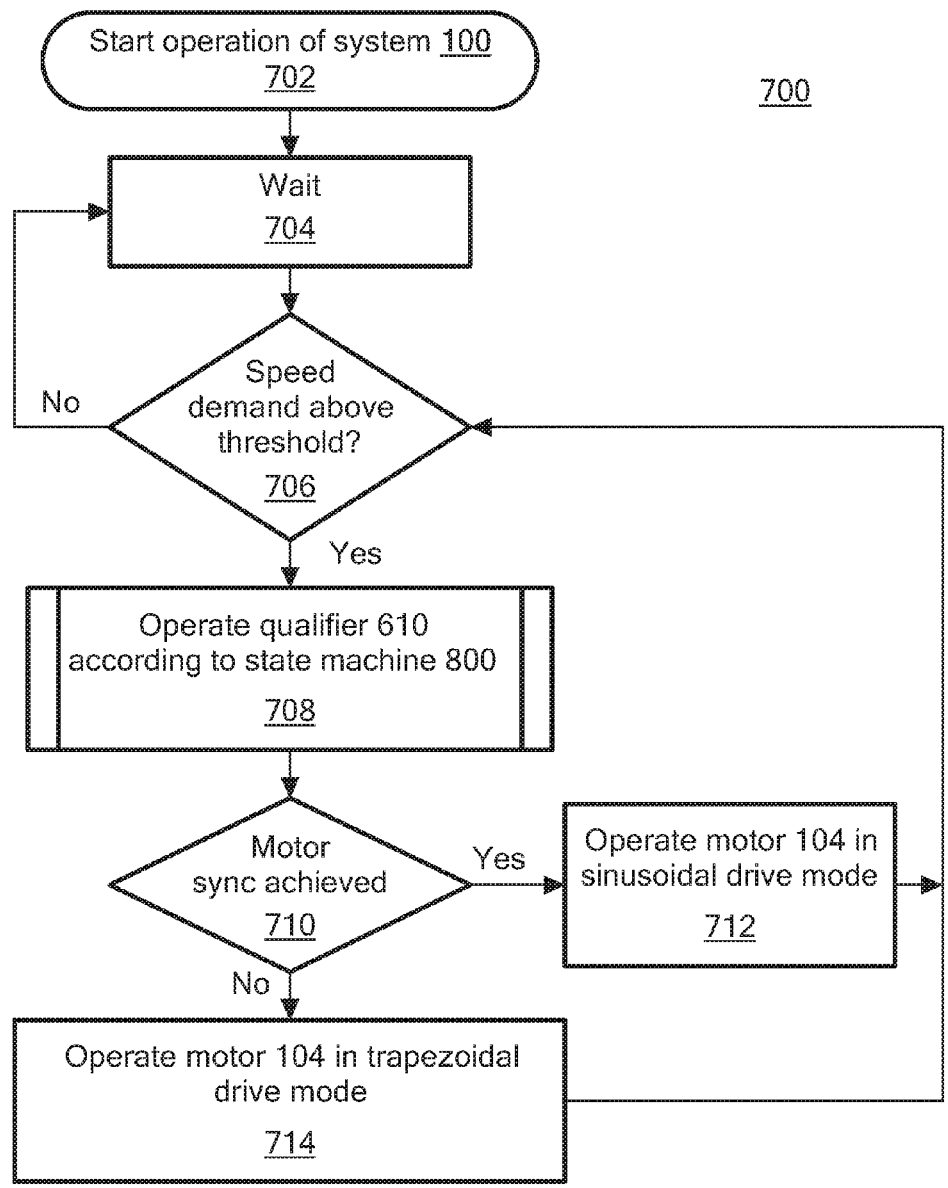
FIG. 7 is a flow diagram showing a technique for processing magnetic field sensor signals by the position and speed sensing circuit of FIG. 6.

Referring to FIG. 7, a flow diagram of motor control technique 700 is shown. At block 702, operation of motor system 100 starts, for example at a first power on of system 100. At block 704, motor control circuit 102 waits to receive a speed demand signal (e.g., speed demand signal 10 of FIG. 1). At block 706, if a received speed demand signal is above a threshold (e.g., non-zero or, in some embodiments, above a minimum threshold speed), then technique 700 proceeds to block 708. Otherwise, if at block 706 the received speed demand signal is not above the threshold (e.g., the speed demand signal is zero or, in some embodiments, below the minimum threshold speed), then technique 700 continues to wait at block 704 to receive a speed demand signal.

At block 708, qualifier 610 of position/speed sensing circuit 120 is operated in accordance with state machine 800, which will be described in greater detail in conjunction with FIG. 8. At block 710 (and while the state machine of FIG. 8 is operating), it is determined (e.g., by Hall processing circuit 130 of position/speed sensing circuit 120 of FIG. 1) whether motor sync (e.g., synchronization) has been achieved. Motor sync is achieved when a minimum speed of rotation of motor 104 is achieved and the Hall elements 108, 110 and 112 are determined to accurately detect the rotational position of motor 104. If, at block 710, motor sync has not yet been achieved (e.g., motor rotational speed is too slow, and the Hall elements have yet to accurately detect the rotational position of the motor), then at block 714, motor control circuit 102 (e.g., drive modulator 116) drives the motor in trap mode (e.g., the drive signal is approximately trapezoidal in shape). Technique 700 returns to block 706 to check the received speed demand signal at block 706, and technique 700 continues to operate until motor system 100 is turned off.

In trap mode at block 714, the values of the qualified Hall signals 30*a* (also referred to as qualified Hall states) are related to the variable duty cycle PWM motor drive signals OUTA, OUTB and OUTC as given in Table 1, where H indicates a high signal, L indicates a low signal, and Z indicates a high impedance (e.g., tri-stated) signal:

TABLE 1

| HA | HB | HC | OUTA | OUTB | OUTC |
|---|---|---|---|---|---|
| Motor Rotation "Forward" | | | | | |
| 1 | 0 | 1 | H | L | Z |
| 1 | 0 | 0 | H | Z | L |
| 1 | 1 | 0 | Z | H | L |
| 0 | 1 | 0 | L | H | Z |
| 0 | 1 | 1 | L | Z | H |
| 0 | 0 | 1 | Z | L | H |
| Motor Rotation "Reverse" | | | | | |
| 0 | 0 | 1 | Z | H | L |
| 0 | 1 | 1 | H | Z | L |
| 0 | 1 | 0 | H | L | Z |
| 1 | 1 | 0 | Z | L | H |
| 1 | 0 | 0 | L | Z | H |
| 1 | 0 | 1 | L | H | Z |

If, at block 710, motor sync has been achieved (e.g., motor rotational speed is at or above a minimum speed, and the Hall elements can accurately detect the rotational position of the motor), then at block 712, motor control circuit 102 (e.g., drive modulator 116) drives the motor in sine mode (e.g., the drive signal is approximately sinusoidal in shape). Technique 700 returns to block 706 to check the received speed demand signal at block 706, and technique 700 continues to operate until motor system 100 is turned off.

In some embodiments, at block 710, motor sync is determined when two consecutive qualified commutation signal pulses (e.g., qualified commutation pulse signal 621) are received and a Hall period counter has not overflowed, indicating that the motor is moving at a sufficient speed and in the expected direction. In sine mode at block 712, a sinusoidal modulation profile is generated based on the qualified theta ramp signal (e.g., 518B of FIG. 5) that represents 0 to 360 degrees of theta (e.g., the rotational position of motor 104). One or more modulation profiles are stored in LUT 134. A corresponding modulation profile is chosen based upon the value of qualified Hall signals 30*a* and direction error signal 623 every time a qualified commutation pulse signal (e.g., 621) is received. In embodiments having a phase advance, an associated phase advance offset is added to the theta ramp to advance the phase in relation to the qualified Hall signals 30*a*. Thus, the theta value at qualified Hall transitions (e.g., when qualified commutation pulse signal 621 is generated) is used to synchronize the modulation profile to the motor. Depending on the desired direction of rotation of motor 104 (e.g., forward or reverse), the OUTB and OUTC waveforms are exchanged.

Referring to FIG. 8, state machine 800 is shown representing the possible values of the 3-bit Hall code employed by qualifier 610. As shown in FIG. 8, as the motor rotates, the 3-bit Hall codes would proceed around the valid Hall states. For example, if motor 104 is moving in a first direction (e.g., forward), the 3-bit Hall codes would be expected to proceed counter-clockwise from Hall state to Hall state (e.g., along state transitions 802, 804, 806, 808, 810 and 812). Similarly, if motor 104 is moving in a second direction (e.g., reverse), the 3-bit Hall codes would be expected to proceed clockwise from Hall state to Hall state (e.g., along state transitions 814, 816, 818, 820, 822 and 824). To avoid erroneous detection of multiple Hall state transitions (e.g., due to one or more of the Hall elements experiencing magnetic fields due to current steps in the motor windings), described embodiments employ qualifier 610 to generate qualified Hall signals 30*a* and qualified theta signal 619, qualified commutation pulse signal 621 and direction error signal 623 (collectively output as signals 31*a*) such that LUT 134 updates the sinusoidal signal (e.g., signal 24*a*) only in response to a valid Hall state change. For example, LUT 134 might update the sinusoidal signal (e.g., signal 24*a*) only once per detected valid Hall state change.

For example, as shown in FIG. 8, when the received speed demand signal 10 is not above a threshold (e.g., the speed demand signal is zero or, in some embodiments, below a minimum threshold speed such that motor 104 is not being driven by variable duty cycle PWM motor drive signals OUTA, OUTB and OUTC), qualifier 610 might operate in the idle state until the motor is in motion and changes in the Hall states can be detected by the Hall elements. Qualifier 610 exits the idle state and proceeds to the detected Hall state (e.g., along state transitions 828, 830, 834, 840, 842 or 848). In each Hall state, the commutation pulse signal (e.g., signal 611) is received and qualifier 610 determines whether to qualify the commutation pulse as a qualified commutation pulse (e.g., signal 621) such that the theta value (e.g., position of the motor) should be updated and, therefore, whether the sinusoidal signal should be updated.

Referring back to FIG. 4, a plot of signals of motor system 100 are shown. For example, the Hall states of state machine 800 of FIG. 8 are shown versus time (and rotation of motor 104) as Hall states 414. For example, as described in conjunction with FIG. 2, signals HA 202, HB 204 and HC 206 might be generated by comparators 602, 604 and 606 and shown collectively as signals 607 of FIG. 6. Magnetic field signals HA, HB and HC are shown in FIG. 4 as waveforms 402, 404 and 406, respectively. Magnetic field signals HA, HB and HC transition when the respective magnetic field sensing element output signals cross the threshold of the respective comparator (e.g., comparators 602, 604 and 606). At any given time, the signal levels of signals HA, HB and HC correspond to the 3-bit Hall state 414, as shown. At each change of the Hall state, a pulse signal (e.g., commutation pulse signal 611) is generated. Signals SA 408, SB 410 and SC 412 correspond to the signals SA, SB and SC described in conjunction with FIGS. 2 and 3 and can be used to generate the motor drive signals OUTA, OUTB and OUTC (or can be used to directly drive motor 104). Theta signal 418 is generated by theta generator 132 as described in conjunction with FIG. 1. As will be described in greater detail in conjunction with FIG. 8, theta signal 418 is incremented by a predetermined amount each time the Hall state changes (until being reset after reaching its maximum value) to determine a rotational position of motor 104. For example, the predetermined increment amount of the theta signal might be the number of degrees between each Hall element of FIG. 1. In the illustrative embodiment shown in FIG. 1, each Hall element is separated by 60 degrees relative to the rotational position of motor 104, so each change in Hall state is associated with a 60 degree rotation of motor 104.

For example, as shown in FIG. 4, at time A, qualifier 610 receives a pulse of commutation pulse signal 611 and the 3-bit Hall state has transitioned from Hall state [011] to Hall state [001] (e.g., along state transition 810). If qualifier 610 qualifies this state change, then theta generator 132 receives qualified signals 30*a* and 31*a* and sets the theta angle to 0 degrees. At time B, qualifier 610 receives a pulse of commutation pulse signal 611 and the 3-bit Hall state has transitioned from Hall state [001] to Hall state [101] (e.g., along state transition 812). If qualifier 610 qualifies this state change, then theta generator 132 receives qualified signals 30*a* and 31*a* and sets the theta angle to 60 degrees.

At time C, qualifier 610 receives a pulse of commutation pulse signal 611 and the 3-bit Hall state has transitioned from Hall state [101] to Hall state [100] (e.g., along state transition 802). If qualifier 610 qualifies this state change, then theta generator 132 receives qualified signals 30*a* and 31*a* and sets the theta angle to 120 degrees. At time D, qualifier 610 receives a pulse of commutation pulse signal 611 and the 3-bit Hall state has transitioned from Hall state [100] to Hall state [110] (e.g., along state transition 804). If qualifier 610 qualifies this state change, then theta generator 132 receives qualified signals 30*a* and 31*a* and sets the theta angle to 180 degrees.

At time E, qualifier 610 receives a pulse of commutation pulse signal 611 and the 3-bit Hall state has transitioned from Hall state [110] to Hall state [010] (e.g., along state transition 806). If qualifier 610 qualifies this state change, then theta generator 132 receives qualified signals 30*a* and 31*a* and sets the theta angle to 240 degrees. At time F, qualifier 610 receives a pulse of commutation pulse signal 611 and the 3-bit Hall state has transitioned from Hall state [010] to Hall state [011] (e.g., along state transition 808). If qualifier 610 qualifies this state change, then theta generator 132 receives qualified signals 30*a* and 31*a* and sets the theta angle to 300 degrees. If, at the next received pulse of commutation pulse signal 611, the Hall state has transitioned from Hall state [011] to Hall state [001] (e.g., along state transition 810), then the theta angle is reset to 0 degrees (e.g., a complete rotation of the motor).

Referring to FIG. 5, an illustrative condition is shown of the signals shown in FIG. 4. In particular, FIG. 5 shows an illustrative error condition in a count value (waveform 502A) that counts the time between commutation pulses (e.g., signal 516A), and in the theta signal (waveform 518A) that is associated with the rotational position of motor 104. In particular, FIG. 5 shows that, at label A, a brief reverse Hall sequence occurs (e.g., Hall state 101 erroneously transitions back to previous state 001) due to glitches in the Hall signals (e.g., filtered Hall signals 609). For example, such glitches might be caused by high current steps in the motor windings as the Hall states transition. In such cases, high current steps might cause glitches in Hall signals, particularly near zero crossings of the magnetic field sensed by a given Hall element.

Incorrect Hall sequences can lead to incorrect Hall commutation pulses (e.g., Hall commutation pulse signal 611), as shown by label B and waveform 516A. In particular, as shown by B, two extra incorrect pulses are generated on Hall commutation pulse signal 611, shown as waveform 516A, due to the glitch in the Hall state sequence as shown by A. These extra incorrect pulses in Hall commutation pulse signal 611 lead to two incorrect resets of count value 502A, as shown by label D. Further, the extra incorrect pulses lead to errors in the theta value (e.g., ramp value 518A), as shown by label F. Errors in the theta value correlate to errors in the determined rotational position of motor 104, which lead to errors in the selection and generation of the sinusoidal modulation profile (e.g., by LUT 134 and wave generator 128 of FIG. 1). For example, as shown in FIG. 5, incorrect commutation pulses at B result in incorrectly setting the theta value to a previous value, creating a non-forward motion output voltage vector, which can cause errors in the motor drive signals and, thus, incorrect operation of motor 104, or even shutdown of motor 104.

However, described embodiments employing qualifier 610 to generate qualified Hall signals 30*a*, qualified theta signal 619 and qualified commutation pulse signal 621, as well as direction error signal 623, allow a Hall commutation pulse in response to a Hall state sequence (e.g., qualified commutation pulse signal 621), as shown by label C, and, specifically, may allow only one qualified Hall commutation pulse per detected valid Hall state sequence. Thus, qualified commutation pulse signal 621 allows only one counter reset per valid Hall sequence as shown by label E, leading to correct setting of theta angle, as shown by label G.

Referring back to FIG. 8, qualifier 610 operates by initializing a current hall register value at system startup (e.g., in the idle state). In each Hall state (e.g., [101], [100], [110], [010], [011], and [001]), qualifier 610 receives a changed Hall state (e.g., filtered Hall signals 609) and a pulse of Hall commutation signal 611. To qualify the received Hall state and commutation pulse, qualifier 610 determines if a direction of rotation of motor 104 has changed from the previous Hall state (e.g., if the current Hall state is not the expected Hall state determined based on one or more previous Hall states).

For example, as shown in FIG. 8, if motor 104 is rotating in a given direction indicated by state transitions 802, 804, 806, 808, 810 and 812, qualifier 610 can determine an expected next state (e.g., at the next commutation pulse 611) of Hall signals 609 (for example, Hall state [001] should transition along 812 to Hall state [101], etc.). If, however, qualifier 610 receives commutation pulse 611 and Hall signals 609 that indicate the motor has reversed its direction of rotation (for example, indicative of Hall state [001] transitioning along 818 to Hall state [011]), then qualifier sets direction error signal 623, and does not qualify the Hall transition since the change in direction could be due to a glitch in the Hall signals 609, and not due to a true change in rotational direction of the motor. When qualifier 610 does not qualify Hall signals 609, qualifier 610 does not generate a qualified commutation pulse (e.g., signal 621) corresponding to the received commutation pulse 611, maintains the previously qualified Hall signals as qualified Hall signals 30*a*, and maintains the previously qualified theta value as the qualified theta signal 619.

For qualifier 610 to qualify Hall signals 609 (e.g., update qualified Hall signals 30*a*, update qualified theta value 619, and generate qualified commutation pulse 621), Hall signals 609 must be equal to the expected next state (e.g., at the next commutation pulse 611, Hall signals 609 must not indicate a change in rotational direction of motor 104, and direction error signal 623 is not set). For example, Hall state [001] should transition along 812 to Hall state [101], and so on. If, at the next commutation pulse 611, direction error signal 623 is set, qualifier 610 determines a number of previous Hall state transitions for which the direction error signal has been set. If the direction error signal has been set for a predetermined threshold number of previous Hall state transitions (e.g., a predetermined number of commutation pulses 611), then qualifier 610 determines that motor 104 has changed direction of rotation, and qualifies Hall signals 609 (e.g., updates qualified Hall signals 30*a*, updates qualified theta value 619, and generates qualified commutation pulse 621) for the reverse direction. Qualifier 610 clears direction error signal 623, since the direction is determined to be correctly detected.

In an illustrative embodiment, qualifier 610 does not qualify Hall signals 609 indicative of a change of motor direction unless direction error signal 623 has been set for at least two previous transitions of Hall state signals 609.

Thus, described embodiments provide an electronic circuit for controlling a motor. The electronic circuit includes a magnetic field sensing circuit responsive to magnetic field sensing elements disposed to sense rotation of the motor. The magnetic field sensing elements generate magnetic field signals, each having a state indicative of a rotational position of the motor. A position and speed sensing circuit generates a signal representative of the rotational position of the motor and a rotational speed of the motor and tracks state changes of the plurality of magnetic field signals. A gate driver circuit generates one or more motor drive signals that drive the motor based, at least in part, upon the sensed rotational position and control a voltage applied to the motor. The position and speed sensing circuit generates a qualified control signal based upon a determined valid state change of the plurality of magnetic field signals. The qualified control signal might include one or more of qualified theta signal 619, qualified commutation pulse signal 621, direction error signal 623, and/or qualified Hall signals 30*a*. The gate driver circuit generates the one or more motor drive signals based, at least in part, upon the qualified control signal.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While the illustrative embodiments have been described with respect to processes of circuits, described embodiments might be implemented as a single integrated circuit, a multi-chip module, a single card, or a multi-card circuit pack. Further, as would be apparent to one skilled in the art, various functions of circuit elements might also be implemented as processing blocks in a software program. Such software might be employed in, for example, a digital signal processor, micro-controller, or general purpose computer. Thus, described embodiments might be implemented in hardware, a combination of hardware and software, software, or software in execution by one or more processors.

Some embodiments might be implemented in the form of methods and apparatuses for practicing those methods. Described embodiments might also be implemented in the form of program code embodied in tangible media, such as magnetic recording media, hard drives, floppy diskettes, magnetic tape media, optical recording media, compact discs (CDs), digital versatile discs (DVDs), solid state memory, hybrid magnetic and solid state memory, or any other machine-readable storage medium, wherein, when the program code is loaded into and executed by a machine, such as a computer, the machine becomes an apparatus for practicing the described embodiments.

Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the described embodiments. When implemented on a processing device, the program code segments combine with the processor to provide a unique device that operates analogously to specific logic circuits. Such processing devices might include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments might also be implemented in the form of a bitstream or other sequence of signal values electrically or optically transmitted through a medium, stored magnetic-field variations in a magnetic recording medium, etc., generated using a method and/or an apparatus as recited in the claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

It should be understood that the steps of the illustrative methods and processes set forth herein are not necessarily required to be performed in the order described, and the order of the steps of such methods and processes should be understood to be merely illustrative. Likewise, additional steps might be included in such methods, and certain steps might be omitted or combined, in methods consistent with various embodiments.

For purposes of this description, it is understood that all gates are powered from a fixed-voltage power domain (or domains) and ground unless shown otherwise. Accordingly, all digital signals generally have voltages that range from approximately ground potential to that of one of the power domains and transition (slew) quickly. However, and unless stated otherwise, ground may be considered a power source having a voltage of approximately zero volts, and a power source having any desired voltage might be substituted for ground. Therefore, all gates might be powered by at least two power sources, with the attendant digital signals therefrom having voltages that range between the approximate voltages of the power sources.

Transistors are typically shown as single devices for illustrative purposes. However, it is understood that transistors will have various sizes and characteristics and might be implemented as multiple transistors coupled in parallel to achieve desired electrical characteristics from the combination, such as a desired physical size (e.g., gate width and length) or operating characteristic (e.g., isolation, switching speed, threshold voltage, gain, etc.). Further, the illustrated transistors might be composite transistors.

Unless explicitly stated otherwise, each numerical value and range should be interpreted as being approximate as if the word "about", "substantially" or "approximately" preceded the value of the value or range.

It will be further understood that various changes in the details, materials, and arrangements of the parts that have been described and illustrated herein might be made by those skilled in the art without departing from the scope of the following claims.

We claim:
1. An electronic circuit for controlling a motor, comprising:
   a magnetic field sensing circuit responsive to a plurality of magnetic field sensing elements disposed to sense rotation of the motor and configured to generate a respective plurality of magnetic field signals, each having a respective state indicative of a rotational position of the motor;
   a position and speed sensing circuit configured to generate a signal representative of at least one of the rotational position of the motor and a rotational speed of the motor, wherein the position and speed sensing circuit tracks state changes of the plurality of magnetic field signals; and
   a gate driver circuit configured to generate one or more motor drive signals that drive the motor based, at least in part, upon the sensed rotational position, wherein the one or more motor drive signals control a voltage applied to the motor;
   wherein the position and speed sensing circuit is configured to generate at least one qualified control signal based upon a determined valid state change of the plurality of magnetic field signals, and
   wherein the gate driver circuit is configured to generate the one or more motor drive signals based, at least in part, upon the qualified control signal,
   wherein the position and speed sensing circuit is configured to modify one or more status indicators based upon the state of the plurality of magnetic field signals, wherein the one or more status indicators comprise:
      a previous state indicator associated with at least one previous state of the plurality of magnetic field signals;
      a current state indicator associated with a current state of the plurality of magnetic field signals; and
         a motor direction indicator, wherein the motor direction indicator is set to one of a plurality of values based upon a detected direction of rotation of the motor and a desired direction of rotation of the motor
   wherein the position and speed sensing circuit is configured to:
      determine that an invalid state change of the plurality of magnetic field signals has occurred when the motor direction indicator is not set and the current state indicator is not equal to an expected value determined based upon the previous state indicator, wherein no qualified control signal is generated for each invalid state change.

2. The electronic circuit of claim 1, wherein a given state of the plurality of magnetic field signals corresponds to a digital output generated based upon the sensed rotation of the motor by the plurality of magnetic field sensing elements.

3. The electronic circuit of claim 1, wherein the position and speed sensing circuit is configured to:
   ignore an invalid state change until the motor direction indicator is set for a predetermined number of consecutive state changes of the plurality of magnetic field signals; and
   when the motor direction indicator has been set for the predetermined number of consecutive state changes:
      generate the at least one qualified control signal; and
      clear the motor direction indicator to a value associated with a valid state change.

4. The electronic circuit of claim 3, wherein the predetermined number of consecutive state changes is two.

5. The electronic circuit of claim 1, wherein the position and speed sensing circuit is configured to:
   for a determined invalid state change of the plurality of magnetic field signals, set the motor direction indicator to a value associated with the invalid state change, and set the expected value based upon the current state indicator.

6. An electronic circuit for controlling a motor, comprising:
   a magnetic field sensing circuit responsive to a plurality of magnetic field sensing elements disposed to sense rotation of the motor and configured to generate a respective plurality of magnetic field signals, each having a respective state indicative of a rotational position of the motor;
   a position and speed sensing circuit configured to generate a signal representative of at least one of the rotational position of the motor and a rotational speed of the motor, wherein the position and speed sensing circuit tracks state changes of the plurality of magnetic field signals; and
   a gate driver circuit configured to generate one or more motor drive signals that drive the motor based, at least in part, upon the sensed rotational position, wherein the one or more motor drive signals control a voltage applied to the motor;
   wherein the position and speed sensing circuit is configured to generate at least one qualified control signal based upon a determined valid state change of the plurality of magnetic field signals, and
   wherein the gate driver circuit is configured to generate the one or more motor drive signals based, at least in part, upon the qualified control signal,
   wherein the position and speed sensing circuit is configured to modify one or more status indicators based upon the state of the plurality of magnetic field signals, wherein the one or more status indicators comprise:
      a previous state indicator associated with at least one previous state of the plurality of magnetic field signals;
      a current state indicator associated with a current state of the plurality of magnetic field signals; and
      a motor direction indicator, wherein the motor direction indicator is set to one of a plurality of values based upon a detected direction of rotation of the motor and a desired direction of rotation of the motor wherein the position and speed sensing circuit is configured to:
   determine that a valid state change of the plurality of magnetic field signals has occurred when the motor direction indicator is not set and the current state indicator is equal to an expected value determined based upon the previous state indicator; and
   generate, for each valid state change, the at least one qualified control signal.

7. The electronic circuit of claim 6, wherein a given state of the plurality of magnetic field signals corresponds to a digital output generated based upon the sensed rotation of the motor by the plurality of magnetic field sensing elements.

8. An electronic circuit for controlling a motor, comprising:
   a magnetic field sensing circuit responsive to a plurality of magnetic field sensing elements disposed to sense rotation of the motor and configured to generate a respective plurality of magnetic field signals, each having a respective state indicative of a rotational position of the motor;
   a position and speed sensing circuit configured to generate a signal representative of at least one of the rotational position of the motor and a rotational speed of the motor, wherein the rotational position is associated with state changes of the plurality of magnetic field signals; and
   a gate driver circuit configured to generate one or more motor drive signals that drive the motor based, at least in part, upon the sensed rotational position, wherein the one or more motor drive signals control a voltage applied to the motor;
   wherein the position and speed sensing circuit is configured to generate at least one qualified control signal a predetermined number of times for an associated valid state change of the plurality of magnetic field signals;
   wherein the position and speed sensing circuit is configured to modify one or more status indicators based upon the state of the plurality of magnetic field signals, wherein the one or more status indicators comprise:
      a previous state indicator associated with at least one previous state of the plurality of magnetic field signals;
      a current state indicator associated with a current state of the plurality of magnetic field signals; and
      a motor direction indicator, wherein the motor direction indicator is set to one of a plurality of values based upon a detected direction of rotation of the motor and a desired direction of rotation of the motor;
   wherein the position and speed sensing circuit is configured to:
      determine that a valid state change of the plurality of magnetic field signals has occurred when the motor direction indicator is not set and the current state indicator is equal to an expected value determined based upon the previous state indicator; and
      generate, for each valid state change the at least one qualified control signal.

9. The electronic circuit of claim 8, wherein the predetermined number of times is one.

10. The electronic circuit of claim 8, wherein a given state of the plurality of magnetic field signals corresponds to a digital output generated based upon the sensed rotational position of the motor.

11. The electronic circuit of claim 8, wherein the gate driver circuit is configured to generate the one or more motor drive signals as one of: a trapezoidal signal, a sine wave signal, and a square wave signal.

12. The electronic circuit of claim 8, wherein the plurality of magnetic field sensing elements comprises Hall effect magnetic field sensing elements.

13. The electronic circuit of claim 8, wherein the motor is a multi-phase electric motor, the gate driver circuit comprises:
   a plurality of half-bridge circuits, each half-bridge circuit associated with a given phase of the multi-phase electric motor, wherein each half-bridge circuit is configured to generate a corresponding one of the motor drive signals, each motor drive signal having a phase that is offset from others of the motor drive signals.

14. The electronic circuit of claim 8, wherein the one or more motor drive signals comprise pulse width modulated signals having respective modulations corresponding to relationships of at least one of a current through the motor and a phase of a voltage applied to the motor.

15. The electronic circuit of claim 8, wherein the gate driver circuit is further configured to:
   generate the motor drive signals having respective phase advances, the phase advances to align a phase of a current through the motor and a phase of a voltage applied to the motor.

16. An electronic circuit for controlling a motor, comprising:
   a magnetic field sensing circuit responsive to a plurality of magnetic field sensing elements disposed to sense rotation of the motor and configured to generate a respective plurality of magnetic field signals, each having a respective state indicative of a rotational position of the motor;
   a position and speed sensing circuit configured to generate a signal representative of at least one of the rotational position of the motor and a rotational speed of the motor, wherein the rotational position is associated with state changes of the plurality of magnetic field signals; and
   a gate driver circuit configured to generate one or more motor drive signals that drive the motor based, at least in part, upon the sensed rotational position, wherein the one or more motor drive signals control a voltage applied to the motor;
   wherein the position and speed sensing circuit is configured to generate at least one qualified control signal a predetermined number of times for an associated valid state change of the plurality of magnetic field signals;
   wherein the position and speed sensing circuit is configured to modify one or more status indicators based upon the state of the plurality of magnetic field signals, wherein the one or more status indicators comprise:
      a previous state indicator associated with at least one previous state of the plurality of magnetic field signals;
      a current state indicator associated with a current state of the plurality of magnetic field signals; and
      a motor direction indicator, wherein the motor direction indicator is set to one of a plurality of values based upon a detected direction of rotation of the motor and a desired direction of rotation of the motor;
   wherein the position and speed sensing circuit is configured to:
      determine that an invalid state change of the plurality of magnetic field signals has occurred when motor direction indicator is not set and the current state indicator is not equal to an expected value determined based upon the previous state indicator, wherein no qualified control signal is generated for each invalid state change.

17. The electronic circuit of claim 16, wherein the position and speed sensing circuit is configured to:
   ignore an invalid state change until the motor direction indicator is set for a predetermined number of consecutive state changes of the plurality of magnetic field signals; and
   when the motor direction indicator has been set for the predetermined number of consecutive state changes:
      generate the at least one qualified control signal; and
      clear the motor direction indicator to a value associated with a valid state change.

18. The electronic circuit of claim 17, wherein the predetermined number of consecutive state changes is two.

19. The electronic circuit of claim 17, wherein the position and speed sensing circuit is configured to:
   for a determined invalid state change of the plurality of magnetic field signals, set the motor direction indicator to a value associated with the invalid state change, and set the expected value based upon the current state indicator.

20. An electronic circuit for controlling a motor, comprising:
   a magnetic field sensing circuit responsive to a plurality of magnetic field sensing elements disposed to sense rotation of the motor and configured to generate a respective plurality of magnetic field signals, each having a respective state indicative of a rotational position of the motor;
   a position and speed sensing circuit configured to generate a signal representative of at least one of the rotational position of the motor and a rotational speed of the motor, wherein the rotational position is associated with state changes of the plurality of magnetic field signals; and
   a gate driver circuit configured to generate one or more motor drive signals that drive the motor based, at least in part, upon the sensed rotational position, wherein the one or more motor drive signals control a voltage applied to the motor;
   wherein the position and speed sensing circuit is configured to generate at least one qualified control signal a predetermined number of times for an associated valid state change of the plurality of magnetic field signals,
      wherein the at least one qualified control signal is insensitive to glitches in state changes of the plurality of magnetic field signals.

21. The electronic circuit of claim 20, wherein the predetermined number of times is one.

22. The electronic circuit of claim 20, wherein a given state of the plurality of magnetic field signals corresponds to a digital output generated based upon the sensed rotational position of the motor.

23. The electronic circuit of claim 20, wherein the position and speed sensing circuit is configured to modify one or more status indicators based upon the state of the plurality of magnetic field signals.

24. The electronic circuit of claim 23, wherein the one or more status indicators comprise:
   a previous state indicator associated with at least one previous state of the plurality of magnetic field signals;
   a current state indicator associated with a current state of the plurality of magnetic field signals; and
   a motor direction indicator, wherein the motor direction indicator is set to one of a plurality of values based upon a detected direction of rotation of the motor and a desired direction of rotation of the motor.

25. The electronic circuit of claim 20, wherein the plurality of magnetic field sensing elements comprises Hall effect magnetic field sensing elements.

26. The electronic circuit of claim 20, wherein the motor is a multi-phase electric motor, the gate driver circuit comprises:
a plurality of half-bridge circuits, each half-bridge circuit associated with a given phase of the multi-phase electric motor, wherein each half-bridge circuit is configured to generate a corresponding one of the motor drive signals, each motor drive signal having a phase that is offset from others of the motor drive signals.

27. The electronic circuit of claim 20, wherein the one or more motor drive signals comprise pulse width modulated signals having respective modulations corresponding to relationships of at least one of a current through the motor and a phase of a voltage applied to the motor.

28. The electronic circuit of claim 20, wherein the gate driver circuit is further configured to:
generate the motor drive signals having respective phase advances, the phase advances to align a phase of a current through the motor and a phase of a voltage applied to the motor.

29. A method of controlling a motor by a motor control circuit, the method comprising:
sensing, responsive to a plurality of magnetic field sensing elements, a rotational position of the motor;
generating a respective plurality of magnetic field signals, each having a respective state indicative of the sensed rotational position of the motor;
generating a signal representative of at least one of the rotational position of the motor and a rotational speed of the motor;
tracking state changes of the plurality of magnetic field signals;
generating one or more motor drive signals that drive the motor based, at least in part, upon the sensed rotational position of the motor, wherein the one or more motor drive signals control a voltage applied to the motor; and
generating at least one qualified control signal a predetermined number of times for an associated valid state change of the plurality of magnetic field signals,
modifying one or more status indicators based upon the state of the plurality of magnetic field signals, wherein the one or more status indicators comprise:
a previous state indicator associated with at least one previous state of the plurality of magnetic field signals;
a current state indicator associated with a current state of the plurality of magnetic field signals; and
a motor direction indicator, wherein the motor direction indicator is set to one of a plurality of values based upon a detected direction of rotation of the motor and a desired direction of rotation of the motor;
determining that a valid state change of the plurality of magnetic field signals has occurred when the motor direction indicator is not set and the current state indicator is equal to an expected value determined based upon the previous state indicator; and
generating, for each valid state change, the at least one qualified control signal.

30. The method of claim 29, comprising:
generating a given state of the plurality of magnetic field signals as a digital signal based upon the sensed rotational position of the motor.

31. A method of controlling a motor by a motor control circuit, the method comprising:
sensing, responsive to a plurality of magnetic field sensing elements, a rotational position of the motor;
generating a respective plurality of magnetic field signals, each having a respective state indicative of the sensed rotational position of the motor;
generating a signal representative of at least one of the rotational position of the motor and a rotational speed of the motor;
tracking state changes of the plurality of magnetic field signals;
generating one or more motor drive signals that drive the motor based, at least in part, upon the sensed rotational position of the motor, wherein the one or more motor drive signals control a voltage applied to the motor; and
generating at least one qualified control signal a predetermined number of times for an associated valid state change of the plurality of magnetic field signals;
modifying one or more status indicators based upon the state of the plurality of magnetic field signals, wherein the one or more status indicators comprise:
a previous state indicator associated with at least one previous state of the plurality of magnetic field signals;
a current state indicator associated with a current state of the plurality of magnetic field signals; and
a motor direction indicator, wherein the motor direction indicator is set to one of a plurality of values based upon a detected direction of rotation of the motor and a desired direction of rotation of the motor;
determining that an invalid state change of the plurality of magnetic field signals has occurred when motor direction indicator is not set and the current state indicator is not equal to an expected value determined based upon the previous state indicator; and
ignoring an invalid state change of the plurality of magnetic field signals until the motor direction indicator is set for a predetermined number of consecutive state changes of the plurality of magnetic field signals; and
when the motor direction indicator has been set for the predetermined number of consecutive state changes:
generating the at least one qualified control signal; and
clearing the motor direction indicator to a value associated with a valid state change.

32. The method of claim 31, wherein the predetermined number of consecutive state changes is two.

33. The method of claim 31, further comprising, for a determined invalid state change of the plurality of magnetic field signals, setting the motor direction indicator to a value associated with the invalid state change, and set the expected value based upon the current state indicator.

\* \* \* \* \*

UNITED STATES PATENT AND TRADEMARK OFFICE
CERTIFICATE OF CORRECTION

PATENT NO.      : 9,960,716 B2
APPLICATION NO. : 15/056287
DATED           : May 1, 2018
INVENTOR(S)     : Lyndon Ambruson et al.

Page 1 of 1

It is certified that error appears in the above-identified patent and that said Letters Patent is hereby corrected as shown below:

In the Specification

Column 1, Line 59 delete "moto." and replace with --motor.--.

Column 2, Line 9 delete "generate" and replace with --generates--.

Column 2, Line 51 delete "set" and replace with --sets--.

Column 3, Line 29 delete "when motor" and replace with --when a motor--.

Column 4, Line 40 delete "when motor" and replace with --when a motor--.

Column 8, Line 9 delete "10 less" and replace with --10 of less--.

Column 9, Line 65 delete "though" and replace with --through--.

Column 10, Line 1 delete "though" and replace with --through--.

Column 10, Line 51 delete "on" and replace with --one--.

Column 11, Line 62 delete "in" and replace with --and--.

Column 13, Line 48 delete "indicative a" and replace with --indicative of a--.

In the Claims

Column 22, Line 60 delete "motor" and replace with --motor,--.

Signed and Sealed this
Ninth Day of October, 2018

Andrei Iancu
*Director of the United States Patent and Trademark Office*